United States Patent [19]

Takayama et al.

[11] Patent Number: 5,739,657
[45] Date of Patent: Apr. 14, 1998

[54] APPARATUS FOR CONTROLLING MOTION OF NORMAL WHEELED OMNI-DIRECTIONAL VEHICLE AND METHOD THEREOF

[75] Inventors: Kuniharu Takayama, Kanagawa; Eiji Nakano, 1-33-33, Hiyoridai, Tomiya-machi, Kurokawa-gun, Miyagi, 981-33; Yoshikazu Mori; Takayuki Takahashi, both of Miyagi, all of Japan

[73] Assignees: Fujitsu Limited, Kawasaki; Eiji Nakano, Kurokawa-gun, both of Japan

[21] Appl. No.: 640,319

[22] Filed: Apr. 30, 1996

[30] Foreign Application Priority Data

May 10, 1995 [JP] Japan ................. 7-112130

[51] Int. Cl.$^6$ ................................. G05D 1/02
[52] U.S. Cl. .............. 318/587; 318/139; 318/489; 180/6.62; 180/7.1; 180/210; 901/1; 701/23
[58] Field of Search ............... 318/560, 587, 318/139; 901/1, 3; 395/80–89; 364/424.02, 424.05, 424.06; 180/167–169, 6.62, 7.1, 210, 212, 211; 701/1, 2, 3, 4, 5, 22, 23, 26

[56] References Cited

U.S. PATENT DOCUMENTS

| | | | |
|---|---|---|---|
| 4,573,548 | 3/1986 | Holland | 180/211 |
| 5,186,270 | 2/1993 | West | 180/6.62 |
| 5,374,879 | 12/1994 | Pin et al. | 318/139 |

OTHER PUBLICATIONS

"On Omni–directional mobile robot" in Development of Robotics 1983 IFS Pub. 1983 pp. 79–87.

P.F. Muir and C.P. Neuman, "Kinematic modeling of wheeled mobile robots," J. Robot. Systems vol. 4, pp. 281–340, 1987.

M. West et al "Design of a holonomic omnidirecti0nal vehicle," in Proc. 1992 IEEE Int. Conf. Robot. Automat (Nice, France, May 1992) pp. 97–103.

G. Pin et al. "A new family of ominidirectional and holonomic wheeled platforms for mobile robots," IEEE Trans. Robot. Automat., vol. 10, No. 4, pp. 480–489, Aug. 1994.

Shigeo Hirose and Shinichi Amano, "High Payload, High Efficiency Holonomic Omini–Directional Vehicle", a series of theses presented during a lecture meeting of robotics and mechantronics at Japan Machinery Society, 1993.

*Primary Examiner*—Paul Ip
*Attorney, Agent, or Firm*—Armstrong, Westerman, Hattori, McLeland & Naughton

[57] ABSTRACT

A controlling apparatus for representing the motion of a normal wheeled omni-directional vehicle (ODV) in a relative coordinate system, and for effectively controlling the ODV and a controlling method thereof. Drive wheels are connected to four corners of the body of the ODV through offset links that can be independently steered. With the offset links, even if the body stops, it can be reoriented without a need to perform a forced direction change operation. The traveling speed of the body, the turning radius of the body, and the angle between the horizontal axis of the body and the traveling direction thereof are defined as relative variables of a relative coordinate system. With these relative variables, the motion of the ODV is designated. The designated motion of the body is converted into the time change or the displacement (drive speed) and the steering angle of each wheel by inverse kinematics. The corresponding control signals are sent to a driving unit of the wheels. Thus, the body is turned with a turning radius about a predetermined point. Consequently, the body can be controlled corresponding to control commands based on the body. In addition, the measured results of the drive speeds and the steering angles of the wheels can be converted into relative variables by forward kinetics so as to determine the motion of the body.

21 Claims, 16 Drawing Sheets

$$\begin{cases} \dot{x} = \dot{x}(t) \\ \dot{y} = \dot{y}(t) \\ \theta = \theta(t) \end{cases}$$

⇩

$$\begin{cases} \ddot{x} = \ddot{x}(t) \\ \ddot{y} = \ddot{y}(t) \\ \theta = \theta(t) \end{cases}$$

⇩

$$\begin{cases} v = (\dot{x}^2 + \dot{y}^2)^{1/2} \\ \rho = \dfrac{(\dot{x}^2 + \dot{y}^2)^{3/2}}{\dot{x}\ddot{y} - \ddot{x}\dot{y}} \\ \phi = \arctan\left\{\dfrac{\dot{y}}{\dot{x}}\right\} - \theta \end{cases} \qquad \begin{cases} v = v(t) \\ \rho = \rho(t) \\ \phi = \phi(t) \end{cases}$$

⇩                                    ⇐⇩

$$\begin{cases} \dot{v} = \dot{v}(t) \\ \dot{\rho} = \dot{\rho}(t) \\ \dot{\phi} = \dot{\phi}(t) \end{cases}$$

⇩

$$\ddot{\phi} = \ddot{\phi}(t)$$

⇩

$$\begin{cases} q_i = q_i(v, \rho, \phi, \dot{\phi}) \\ \dot{q}_i = \dot{q}_i(v, \rho, \phi, \dot{v}, \dot{\rho}, \dot{\phi}, \ddot{\phi}) \\ \lambda_i = \lambda_i(v, \rho, \phi, \dot{\phi}, \dot{q}_i) \end{cases}$$

FIG. 14

APPARATUS FOR CONTROLLING MOTION OF NORMAL WHEELED OMNI-DIRECTIONAL VEHICLE AND METHOD THEREOF

BACKGROUND OF THE INVENTION

1. Field of the Invention

The present invention relates to an apparatus for recognizing the motion of a vehicle that travels on the ground and controlling the motion thereof and a method thereof.

2. Description of the Related Art

A mobile robot is one of two major elements of a robot system along with a robot arm. Thus far, many types of mobile robots have been developed. These mobile robots are mainly categorized as a wheel type robot, a crawler type robot, a leg type robot, and a limbless type robot. The wheel type mobile robot is a robot that has at least one wheel and is suitable for traveling over a smooth surface. The crawler type mobile robot is a mobile robot that has an endless traveling belt such as a caterpillar tread and is suitable for traveling on a rough surface. The leg type mobile robot is a mobile robot that has legs forming part of a creature such as a human being. The limbless type mobile robot is a mobile robot that travels by dragging its body, like a snake or an earthworm. These mobile robots can travel in a manner similar to that of living creatures.

For traveling on a smooth surface, the wheel type mobile robot has been widely studied because of its high energy efficiency and simple structure. In particular, a three-wheel type mobile robot has been studied. The three-wheel type mobile robot is categorized into two types. The first type of robot has two drive wheels and one supplementary wheel. The steering of this type robot is accomplished by the difference in the rotational speed of the two independent drive wheels. The second type of robot has a pair of common drive wheels and one steering wheel. The two drive wheels are linked through a differential gear or the like. A four-wheel type mobile robot can be treated as a modification of the three-wheel type mobile robot. The three-wheel type mobile robot or the four-wheel type mobile robot can be basically treated as a nonholonomic system having two inputs of driving and steering.

Generally, when a constraint on variables of a dynamic system is represented by an algebraic equation, the constraint is referred to as a holonomic constraint. Other constraints are referred to as nonholonomic constraints. A system involving only holonomic constraints is referred to as a holonomic system. A system involving at least one nonholonomic constraint is referred to as a nonholonomic system. For example, when a constraint of a position of a moving object is represented by an algebraic equation, the object is treated as a holonomic system. When a constraint of a position of a moving object is represented by only a differential equation or the like, the object is treated as a nonholonomic system. A vertical disc that rotates on a surface, and does not slide is well known as an example of a nonholonomic system. Thus, many of the wheel type mobile robots that have wheels functioning as such discs are nonholonomic systems.

Due to the nonholonomic characteristics of the constraints, a three-wheel type mobile robot or a four-wheel type mobile robot can reach any position in any posture within three degrees of freedom consisting of two degrees of freedom with respect to position and one degree of freedom with respect to direction. However, to do that, a very complicated path should be planed and presently, a variety of techniques are being studied. It is noted that such mobile robots are often expected to work in narrow spaces in hospitals, offices, plants, and so forth. In this case, it becomes more difficult to plan the motions of such mobile robot.

As an attempt to thoroughly solve such a problem, an omni-directional vehicle (ODV) that can travel in any direction without a need to perform a forced direction change operation was invented (see Eiji Nakano et al. "Mechanism of Omni-directional Vehicle (Development of Omni-directional Vehicle: No. 1)", The Japan Society of Mechanical Engineers—Kansai-Branch No. 55 Regular Session Lecture", March, 1980, pp. 61–63). The forced direction change operation means a wheel direction changing operation forcedly performed about the wheels on the ground. Following such an invention, various ODVs had been studied. Such ODVs are categorized as holonomic ODVs and nonholonomic ODVs (see Hirohiko Nakamura, "Nonholonomic Robot System", Journal of Robotics Society of Japan, Vol. 11, No. 4–7, pp. 521–528, 655–662, 837–844, 999–1005, 1993, Vol. 12, No. 2, pp. 231–239, 1994).

FIG. 1 is a schematic diagram showing a conventional holonomic ODV. The ODV shown in FIG. 1 has three wheels 1-1, 1-2, and 1-3. These wheels are disposed at intervals of 120° around a common center. The ODV can immediately travel from any position in any posture in any direction. To do this, the ODV has a special wheel mechanism as shown in FIG. 2. Referring to FIG. 2, four rollers 2-1, 2-2, 2-3, and 2-4 are disposed on the periphery of the wheel 1-1. With these rollers, the ODV can travel in the direction of the rotating axis of the wheels while they are contacting the ground.

On the other hand, a nonholonomic ODV uses normal wheels as in tire-type wheels, rather than such a special wheel mechanism as shown in FIG. 2, so as to accomplish mechanical strength, increased loading capacity, and to overcome small gaps in the ground. However, since the nonholonomic ODV has a normal wheel mechanism, it requires a preparative steering operation for travel in any given direction.

The general theory of unified kinematics for various wheeled vehicles including such nonholonomic ODVs is described in a Tsukishima's technical paper (Takahiro Tsukishima et al., "Study on General Theory of Dynamics and Kinematics of Wheeled Vehicles", Journal of Robotics Society of Japan, Vol. 8, No. 6, pp. 59–71, 1990). The kinematics is a general term indicating both of forward kinematics and inverse kinematics. In the case of an ODV that uses normal wheels, by using equations of the forward kinematics, the traveling speed and turning radius of the body can be calculated, with the driving speed and the steering angle of the wheels detected by sensors. In addition, the limit values of the traveling speed and the turning radius of the body can be obtained with the limit values of the driving speed and the steering angle of the wheels. On the other hand, by using equations of the inverse kinematics, the motion of each wheel necessary for accomplishing the motion of the body can be obtained. In the general theory, the motion of the body is represented in an absolute coordinate system to the environment of the body.

However, the conventional method for representing the motion of a nonholonomic ODV has the following problem.

To uniformly deal with various wheeled vehicles, it is necessary to represent the motions of vehicles in the absolute coordinate system. On the other hand, when a vehicle is produced and operated, it is convenient to designate the motion of the vehicle in a relative coordinate system defined to the vehicle. Now assume a situation in which a vehicle that travels in a room detects an obstacle with information received from its sensor and travels so that it does not collide with the obstacle. In this case, for example, a command for causing the vehicle to travel from the present position in a direction of 45° to the right for 6 cm is much more easily understandable than a command for causing the vehicle to travel from the present position to a position (12.34, 56.78) in an absolute x-y coordinate system of the room in which the vehicle travels.

Thus, ideally, it is preferable to designate the motion of a vehicle in both the absolute coordinate system and the relative coordinate system. However, in the normal wheeled omni-directional vehicle, since such a relative coordinate system has not yet been developed, the motion should be designated in the absolute coordinate system.

SUMMARY OF THE INVENTION

An object of the present invention is to provide an apparatus for representing the motion of an ODV in a relative coordinate system defined for the ODV and for effectively controlling the ODV and a method thereof.

A first aspect of the present invention is a controlling apparatus for controlling the motion of a normal wheeled omni-directional vehicle that can travel in several directions, comprising a storing unit for storing a first control command for designating the motion of a body of the normal wheeled omni-directional vehicle, with relative variables of a relative coordinate system defined for the body of the normal wheeled omni-directional vehicle, and a converting unit for converting the first control command into motions of the wheels of the normal wheeled omni-directional vehicle by calculations of inverse kinematics in the relative coordinate system, obtaining drive variables representing the motions of the wheels, and outputting control signals corresponding to the obtained drive variables.

A second aspect of the present invention is a method for controlling the motion of a normal wheeled omni-directional vehicle that can travel in several directions, comprising the steps of designating the motion of a body of the normal wheeled omni-directional vehicle, with relative variables of a relative coordinate system defined for the body of the normal wheeled omni-directional vehicle, converting a first control command into motions of the wheels of the normal wheeled omni-directional vehicle by calculations of inverse kinematics in the relative coordinate system, so as to obtain drive variables representing the motions of the wheels, and controlling the motions of the wheels with the obtained drive variables.

The controlling method according to the present invention can be accomplished by a computer program. In this case, the program is stored in a storage medium such as a magnetic disc, an optical disc, a magneto-optical disc, a RAM, and or a ROM. The program is used in a computer to control the vehicle.

A third aspect of the present invention is a normal wheeled omni-directional vehicle having normal wheels for traveling in several directions, comprising a storing unit for storing a control command for designating the motion of a body of the normal wheeled omni-directional vehicle, with relative variables of a relative coordinate system defined for the body of the normal wheeled omni-directional vehicle, and a converting unit for converting the control command into motions of the wheels of the normal wheeled omni-directional vehicle by calculations of inverse kinematics in the relative coordinate system, obtaining drive variables representing the motions of the wheels, and outputting control signals corresponding to the obtained drive variables.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 14 shows equations indicating unified inverse kinematics;

DESCRIPTION OF THE PREFERRED EMBODIMENT

Figure 3:
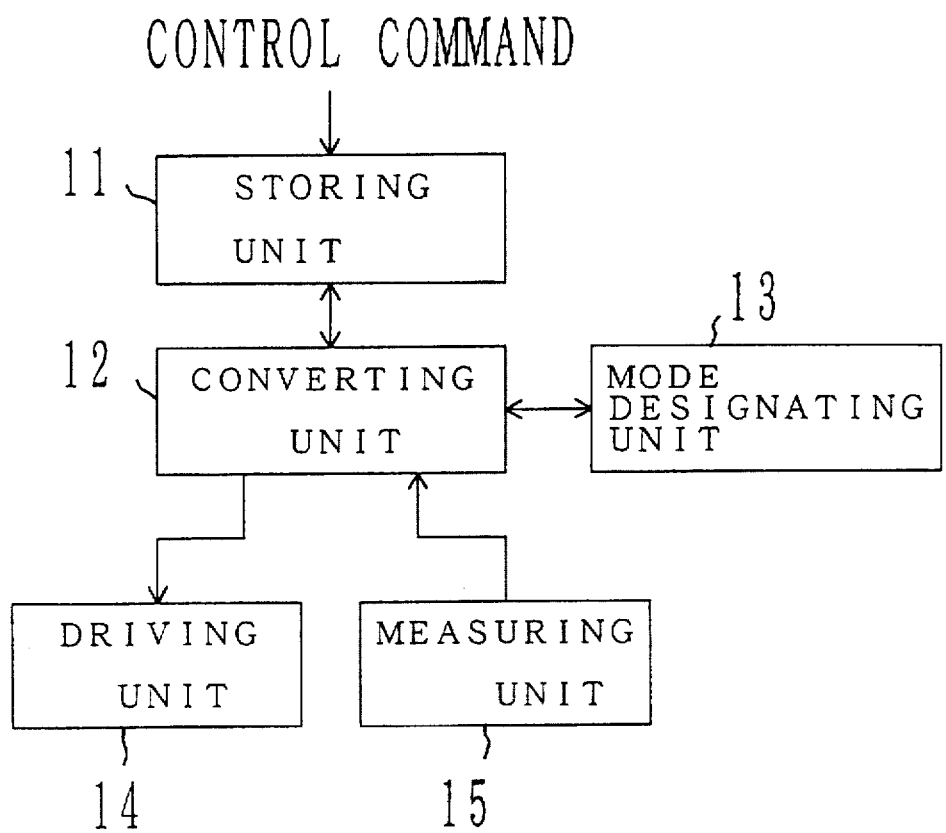
FIG. 3 is a block diagram showing the theory of the present invention.

FIG. 3 is a block diagram showing the theory of a controlling unit of an omni-directional vehicle (ODV) according to the present invention. The controlling unit shown in FIG. 3 comprises a storing unit 11, a converting unit 12, a mode designating unit 13, a driving unit 14, and a measuring unit 15.

The storing unit 11 stores relative variables of a relative coordinate system of the body as control commands for designating the motion of the body of the ODV. The relative variables stored in the storing unit 11 are, for example, the traveling speed of the body, the turning radius of the body, and the angle representing the traveling direction of the body.

The converting means 12 converts a control command into the motions of the wheels of the ODV by calculations of inverse kinematics for the relative coordinate system.

obtains drive variables representing the motions of the wheels, and outputs control signals corresponding to the obtained drive variables. The drive variables obtained by the converting unit 12 are, for example, the drive speeds of the wheels and the steering angles of the wheels.

The driving unit 14 receives the control signals from the converting unit 12 and drives or steers the wheels corresponding to the control commands.

The mode designating unit 13 selects one of a plurality of motion modes of the ODV corresponding to the value of the turning radius and informs the converting unit 12 of the selected motion mode. The converting unit 12 obtains drive variables corresponding to the received motion mode.

The measuring unit 15 measures the values of the drive variables and outputs the measured results to the converting unit 12. At this point, the converting unit 12 converts the received results into the relative variables by calculations of forward kinematics, recognizes the motion of the vehicle corresponding to the relative variables, and outputs the recognized results. The storing unit 11 stores the detected results.

Figure 5:
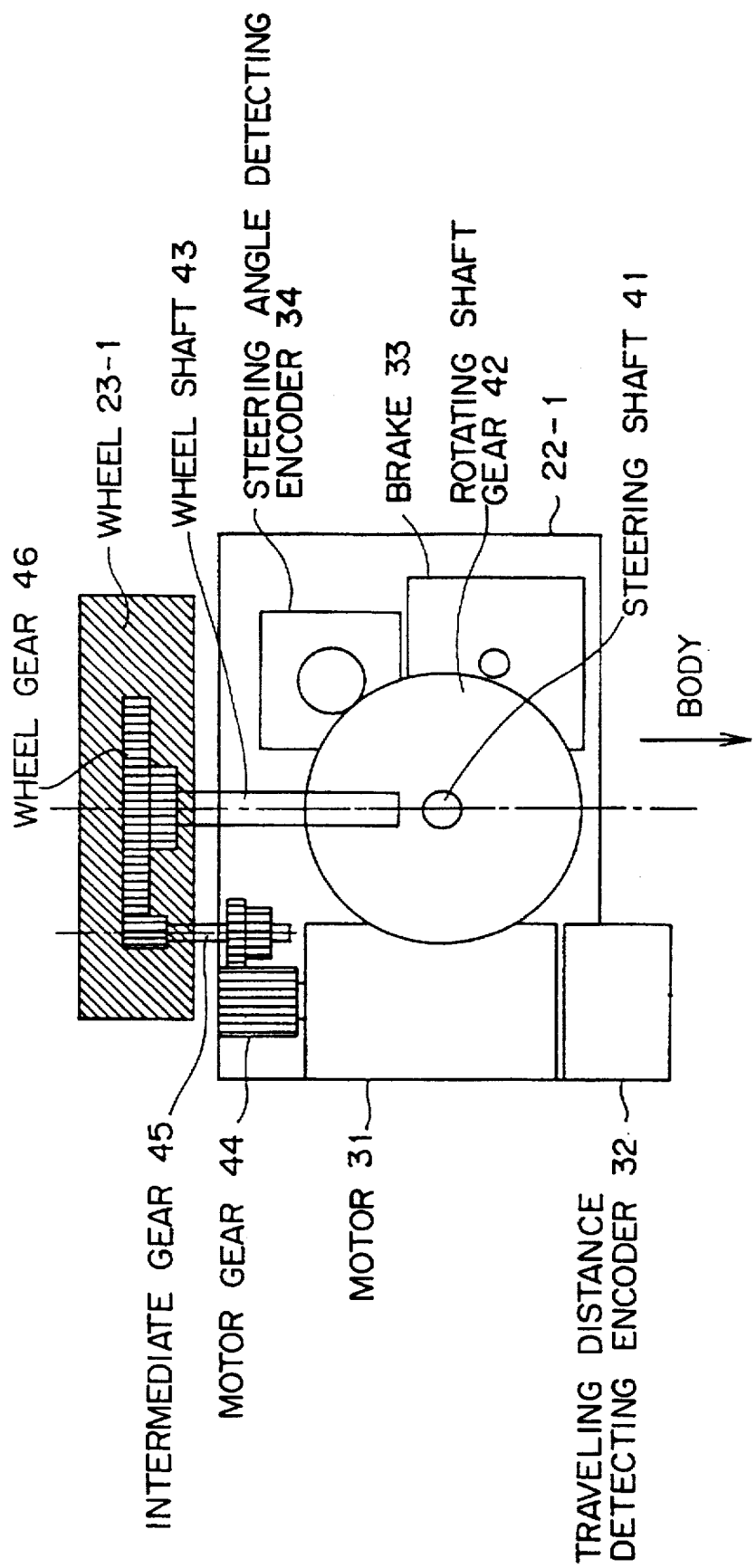
FIG. 5 is a schematic diagram showing a wheel mechanism of the omni-directional vehicle.
Figure 6:
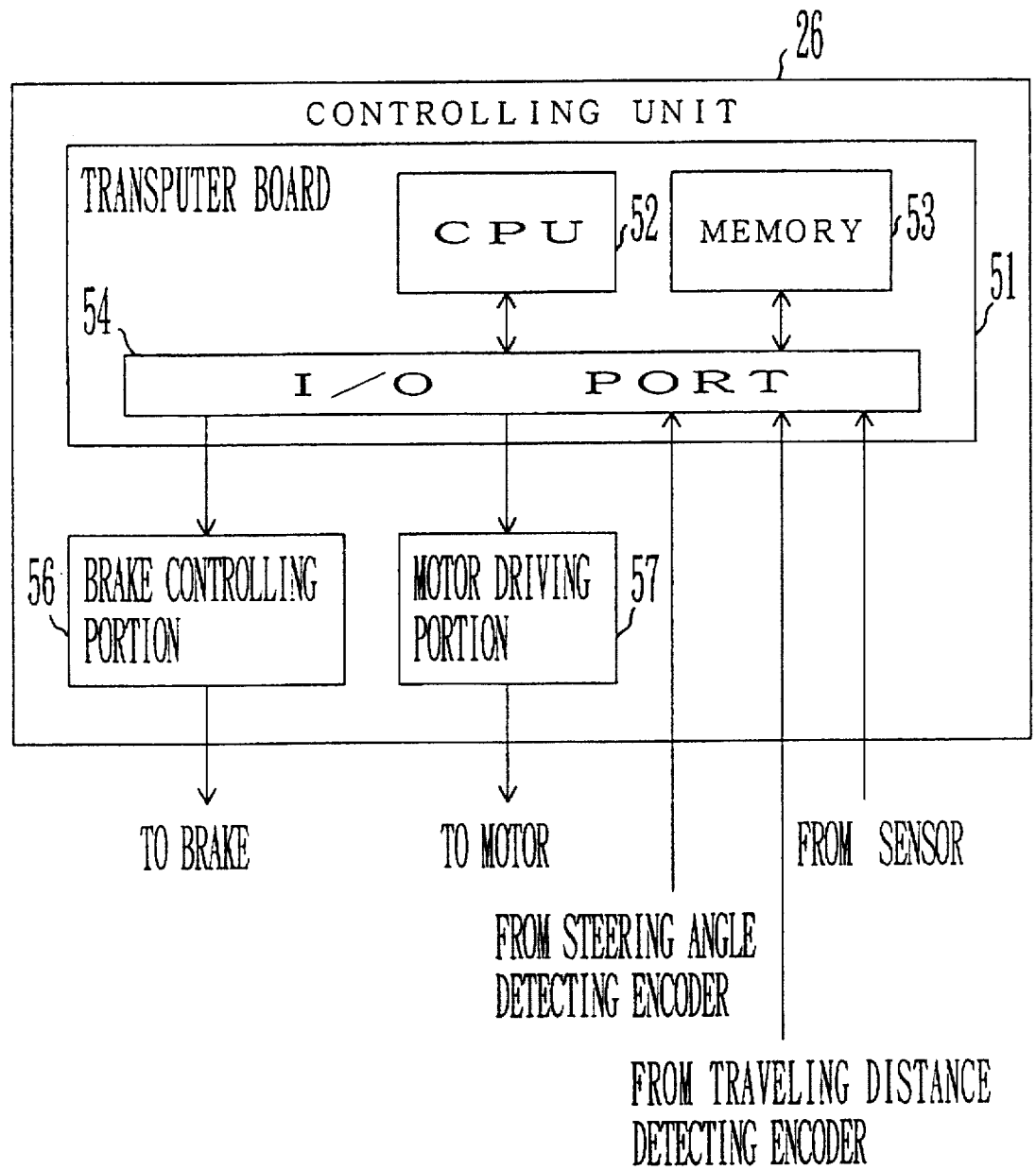
FIG. 6 is a block diagram showing a structure of a controlling unit of the omni-directional vehicle.

The storing unit 11 shown in FIG. 3 corresponds to a memory 53 shown in FIG. 6. The converting unit 12 and the mode designating unit 13 correspond to a CPU (central processing unit) 52 shown in FIG. 6. The driving unit 14 corresponds to a brake controlling portion 56, a motor driving portion 57 shown in FIG. 6, a brake 33, and a motor 31 shown in FIG. 5. The measuring unit 15 corresponds to a traveling distance detecting encoder 32 and a steering angle detecting encoder 34 shown in FIG. 5.

Figure 10:
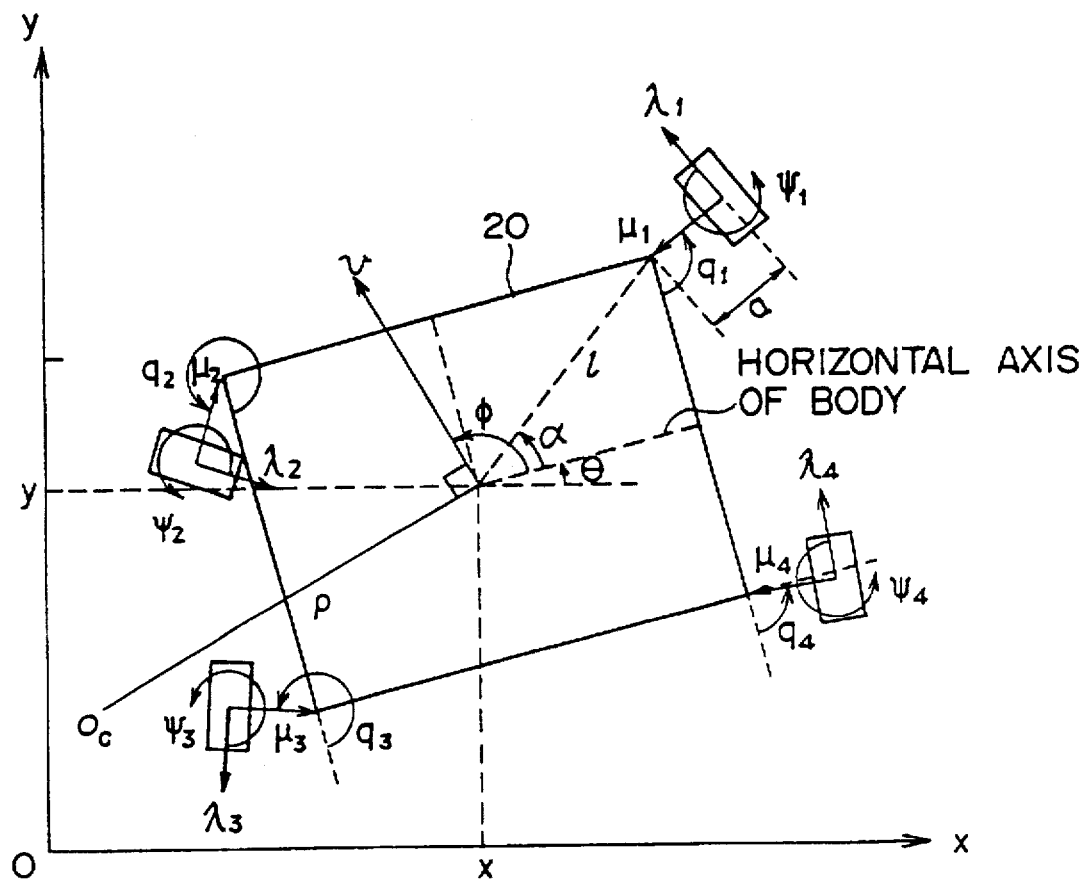
FIG. 10 is a graph showing a model of the omni-directional vehicle.

The traveling speed of the body, the turning radius of the body, and the angle representing the traveling direction of the body accord with, for example, v, ρ, and φ shown in FIG. 10, respectively. The angle representing the traveling direction of the body can be freely defined as an angle between any axis fixed to the body and the traveling direction of the body. The drive speeds of the wheels and the steering angles of the wheels accord with, for example, the differentiation of displacement $\lambda_i$ with respect to time and the steering angle $q_i$ (where i=1, 2, 3, 4) of the wheels shown in FIG. 10.

The motion of the body of the ODV is designated in a relative coordinate system defined for the body of the ODV rather than an absolute coordinate system defined for the external environment of the body. Thus, the converting unit 12 interprets control commands for the motion of the body corresponding to the position and the orientation of the body. The motion of the body can be designated with relative variables such as the traveling speed of the body, the turning radius of the body, and the angle representing the traveling direction of the body. Thus, control commands for preventing an obstacle can be effectively given to the ODV.

The converting unit 12 converts the control commands into the motions of the wheels of the ODV by calculations of inverse kinematics and obtains drive variables required for the designated motions. Thus, the drive speeds, the steering angles, and so forth to be accomplished for the wheels can be obtained. The driving unit 14 receives the control signals corresponding to the obtained drive variables from the converting unit 12 and drives or steers the wheels corresponding to the control signals. Thus, the ODV performs the motion represented in the relative coordinate system.

The motion of the ODV can be categorized as a plurality of motion modes corresponding to the value of the turning radius of the relative variables. Thus, when the value of the turning radius is properly designated, the corresponding motion mode can be designated. The mode designating unit selects one of motion modes, corresponding to the value of the designated turning radius and informs the converting unit 12 of the selected mode. The converting unit 12 obtains proper drive variables by calculations of inverse kinematics corresponding to the informed motion mode and controls the driving unit 14 corresponding to the drive variables. Thus, the ODV can be controlled by changing the motion modes.

The measuring unit 15 measures the values of the drive variables for the wheels obtained by the driving unit 14. The converting unit 12 receives the measured results from the measuring unit 13, converts them into the relative variables by calculations of forward kinematics, and recognizes the motion of the body. Thus, the detected results can be compared with the control commands so as to determine whether or not the designated motion has been performed. When the storing unit 11 stores the recognized results, the converting unit 12 can convert the next control commands and generate control signals corresponding to the recognized results.

Next, with reference to the accompanying drawings, an embodiment of the present invention will be described.

In the embodiment, equations of forward kinematics and inverse kinematics of a normal wheeled omni-directional vehicle (NW-ODV) featured as a nonholonomic system are systematically obtained. In this embodiment, an ideal model of NW-ODVs that have been studied and developed is described. By the inverse kinematics, the motions of the wheels necessary for accomplishing the motion of a given body are obtained. By the forward kinematics, the limit values of the traveling speed and the turning radius of the body corresponding to the limit values of the drive speeds and the steering angles of the wheels are obtained.

In this process, both an absolute coordinate system and a relative coordinate system for representing and designating the motion of the body are used. The relative coordinate system is effective, for example, when the vehicle avoids an obstacle corresponding to information received from a sensor of the vehicle. Besides, the relative coordinate system significantly relates to the motion modes of the vehicle. The motion modes are, for example, translational mode (including going straight, slantwise, and sidewise), turning mode, and rotational mode. With the relative coordinate system, the relation between the conception of the motion modes and the motion of the body becomes clear. Thus, one approach to the motion plan of a nonholonomic system can be accomplished.

Figure 1:
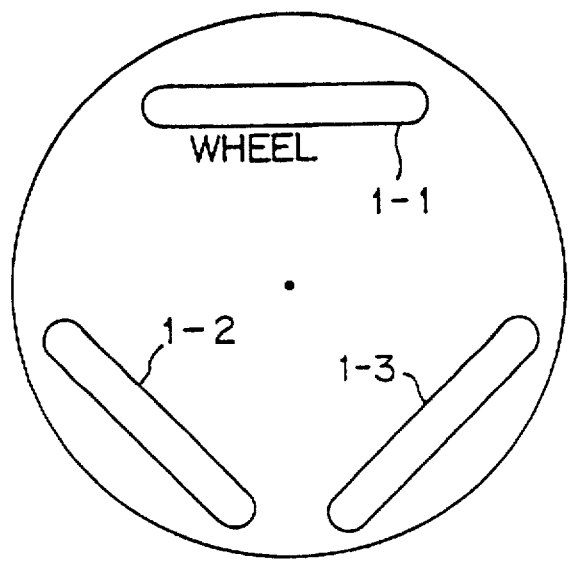
FIG. 1 is a schematic diagram showing a conventional omni-directional vehicle.
Figure 2:
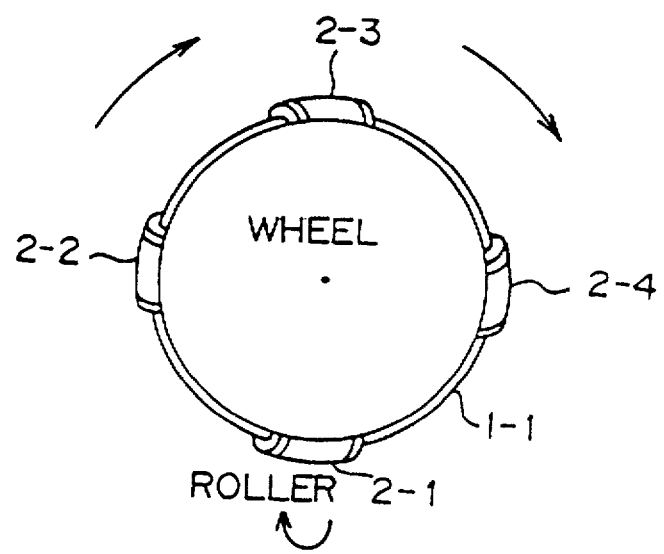
FIG. 2 is a schematic diagram showing a wheel of the conventional omni-directional vehicle.
Figure 4:
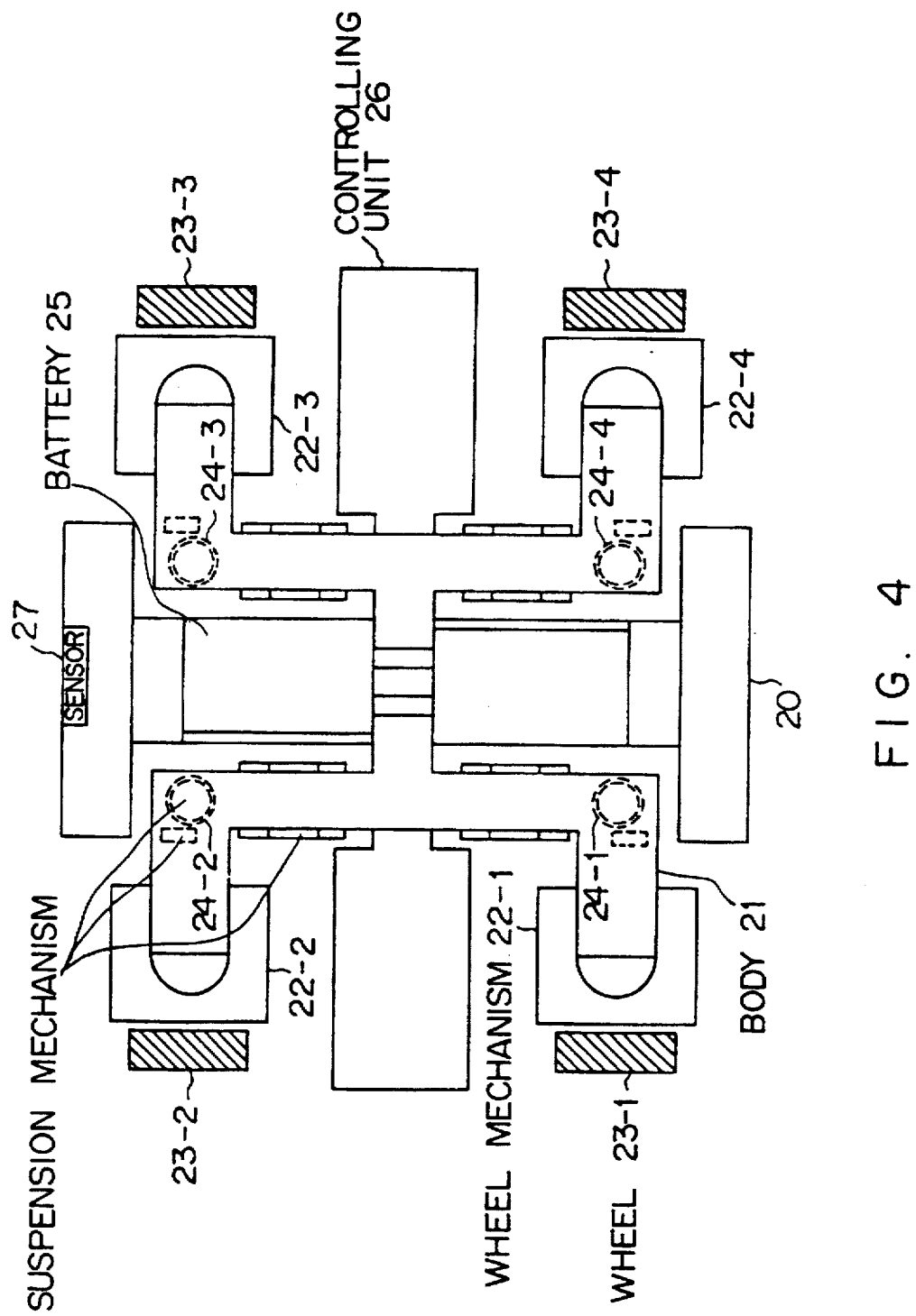
FIG. 4 is a schematic diagram showing a structure of an omni-directional vehicle according to an embodiment of the present invention.

FIG. 4 is a schematic diagram showing a structure of a normal wheeled ODV according to the embodiment of the present invention. The ODV 20 shown in FIG. 2 has a body 21, wheel mechanisms 22-1, 22-2, 22-3, and 22-4, and wheels 23-1, 23-2, 23-3, and 23-4. The body 21 has suspension mechanisms 24-1, 24-2, 24-3, and 24-4 (that support the respective wheel mechanisms), a battery 25, a controlling unit 26, and a sensor 27. The wheel mechanism 22-1, 22-2, 22-3, and 22-4 drive the wheels 23-1, 23-2, 23-3, and 23-4 and measure the driven results. The controlling unit 26 controls the wheel mechanisms 22-1, 22-2, 22-3, and 22-4. The battery 25 supplies an electric power to the wheel mechanisms 22-1, 22-2, 22-3, and 22-4 and the controlling unit 26. The sensor 27 detects any obstacles and sends the detected result to the controlling unit 26.

FIG. 5 is a schematic diagram showing a structure of the wheel mechanism 22-1 and the wheel 23-1. In FIG. 5, a rotating shaft gear 42 of the wheel mechanism 22-1 is fixed to the body 21 through a steering shaft 41. The wheel mechanism 22-1 has a motor 31, a traveling distance detecting encoder 32, a steering angle detecting encoder 34, and a brake 33. The motion of the motor 31 is transmitted to a wheel gear 46 fixed to the wheel 23-1 through a motor gear 44 and an intermediate gear 45. The wheel shaft 43 of the wheel gear 46 is fixed to the wheel mechanism 22-1. When the brake 33 is released, the wheel 23-1 is rotated about the steering shaft 41 and thereby the steering angle is varied. When the brake 33 is activated, the steering angle is fixed and the motor 31 drives the wheel 23-1.

The steering angle detecting encoder 34 detects the steering angle of the wheel shaft 43. The traveling distance detecting encoder 32 detects the rotation (drive speed) of the wheel 23-1 or the motor 31 and converts the rotation into the traveling distance. These operations apply to the other three sets of the wheel mechanisms and wheels.

FIG. 6 is a block diagram showing a structure of the controlling unit 26. The controlling unit 26 shown in FIG. 6 has a transputer board 51, a brake controlling portion 56, and a motor driving portion 57. The transputer board 51 has a CPU 52, a memory 53, and an I/O (input/output) port 54. The CPU 52 recognizes the motion of the ODV 20 with information received from the steering angle detecting encoder 34 and the traveling distance detecting encoder 32 through the I/O port 54, and stores the detected result in the memory 53. In addition, the CPU 52 executes a given program and sends a control signal for accomplishing a motion designated by the user to the brake controlling portion 56 and the motor driving portion 57 through the I/O port 54. Information about an obstacle is sent from the sensor 27 to the CPU 52 through the I/O port 54. A program executed by the CPU 52 is created on an external work station. The brake controlling portion 56 releases and activates the brake 33 corresponding to a control signal received from the CPU 52. The motor driving portion 57 drives the motor 31 corresponding to a control signal received from the CPU 52.

Figure 7:
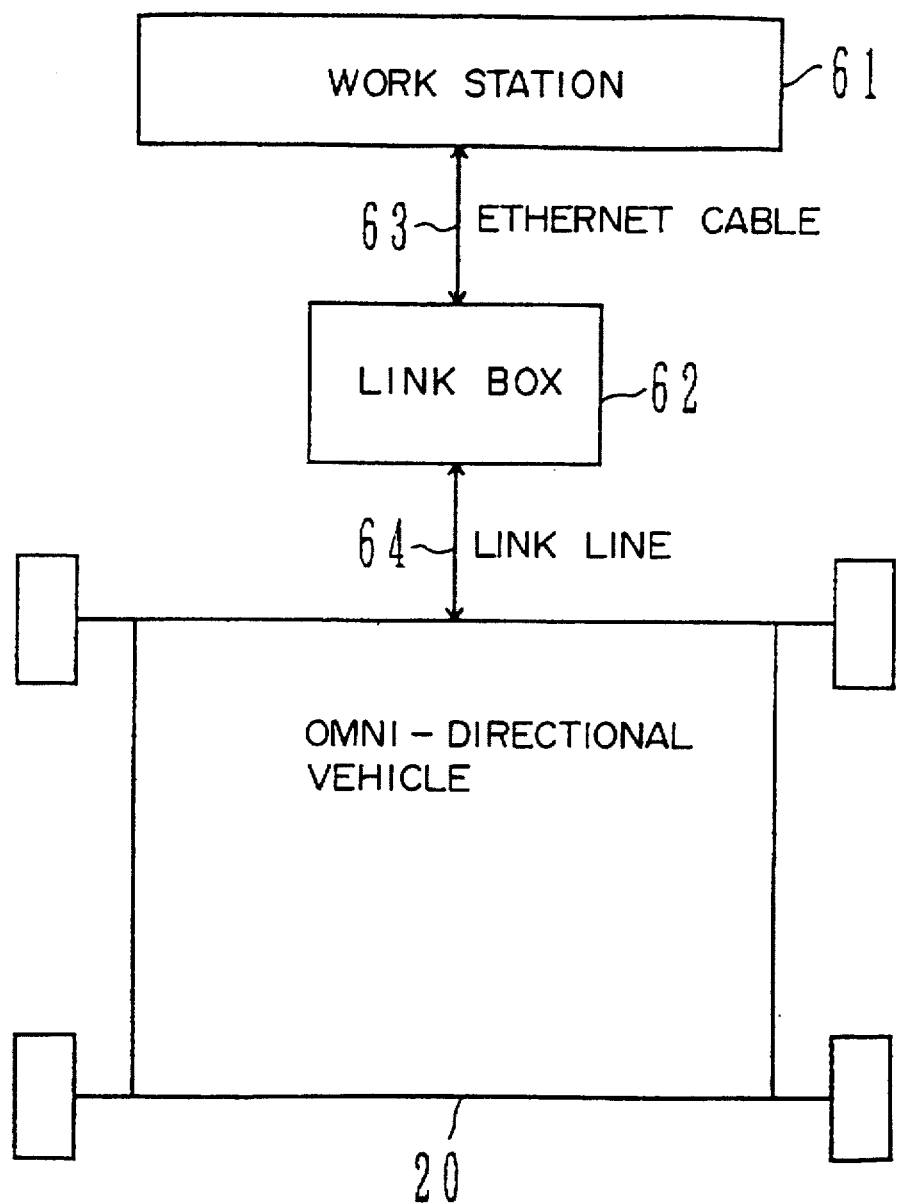
FIG. 7 is a block diagram showing connections between a work station and the omni-directional vehicle.

FIG. 7 is a block diagram showing connections of a work station for creating a program and the ODV 20. In FIG. 7, the work station 61 and the ODV 20 are connected through an Ethernet cable 63, a link box 62, and a link line 64. A program created on the work station 61 is downloaded to the transputer board 51 of the controlling unit 26 through the Ethernet cable 63 and stored in the memory 53. The program stored in the memory 53 is executed by the CPU 52.

Next, with reference to FIGS. 8 to 16, the processes of the CPU 52 and examples of the motions of the ODV 20 corresponding to the processes will be described.

Figure 8:
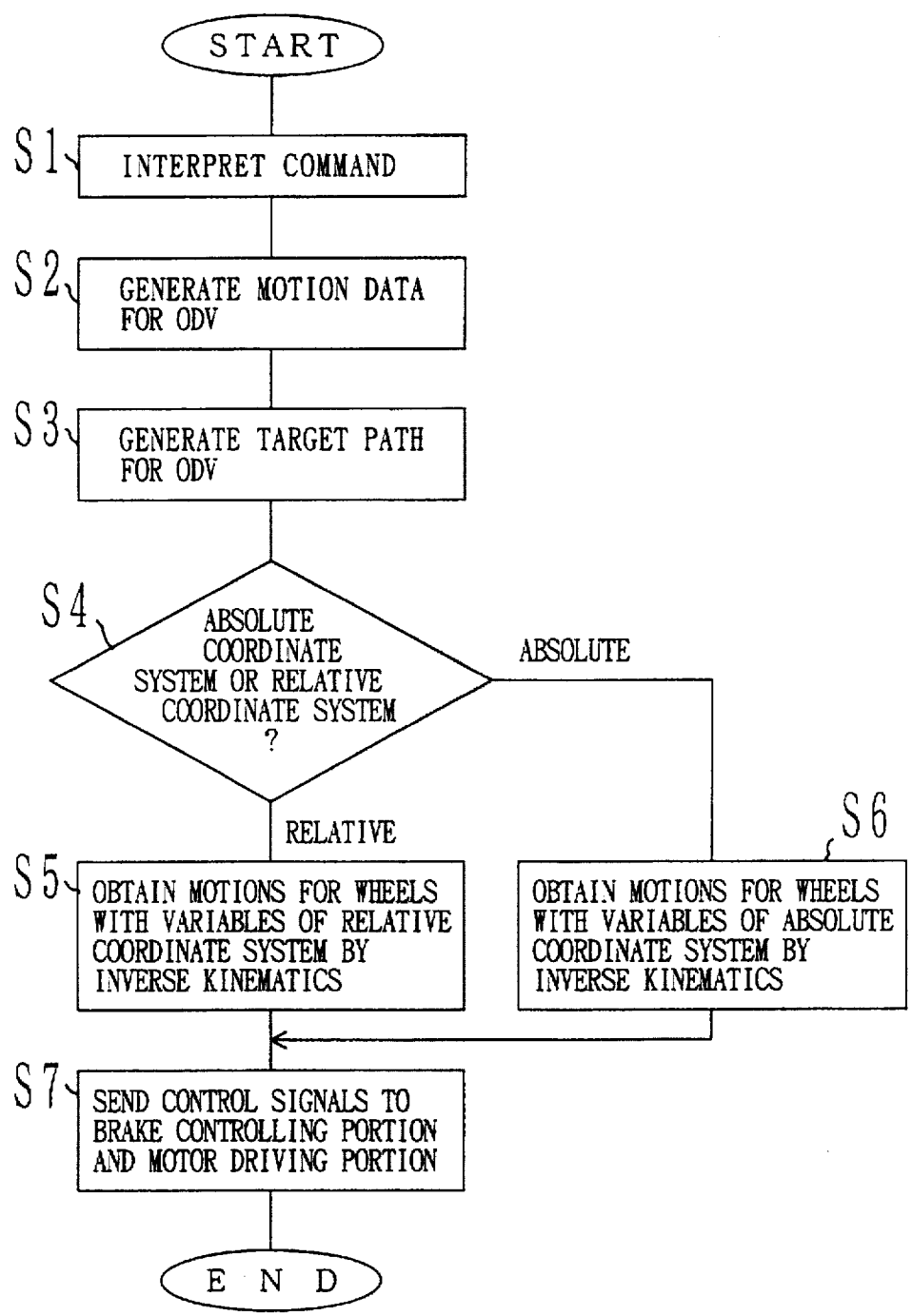
FIG. 8 is a flow chart showing a controlling process of the motion of the omni-directional vehicle.

FIG. 8 is a flow chart showing a controlling process performed by the CPU 52. When the process shown in FIG. 8 is started, the CPU 52 interprets a command in a program created by the user (at step S1) and generates motion data for the ODV 20 (at step S2). At step S1, if necessary, the CPU 52 changes an interpreted command corresponding to past motion data stored in the memory 53 and determines coarse motion data. At this point, for example, the CPU 52 selects a motion mode. At step S2, if necessary, the CPU 52 compensates the interpreted result corresponding to the past motion data stored in the memory 53 and obstacle information received from the sensor 27, and determines real motion data. In addition, at this point, for example, the CPU 52 determines a sequence of coordinates of discrete points that the ODV 20 passes and a coarse shape of the path that connects the points.

Thereafter, the CPU 52 generates a target path that successively connects the points that the ODV 20 passes as functions of the positions and speeds of the ODV 20 (at step S3). Next, the CPU 52 determines whether the target path has been represented in an absolute coordinate system or a relative coordinate system (at step S4). When the target path has been represented with variables of the relative coordinate system, the CPU 52 obtains the motions for the wheels with the variables by inverse kinematics in the relative coordinate system (at step S5). When the target path has been represented with variables of the absolute coordinate system, the CPU 52 obtains the motions for the wheels with the variables by inverse kinematics in the absolute coordinate system (at step S6). The CPU 52 sends control signals corresponding to the motions for the wheels to the brake controlling portion 56 and the motor driving portion 57 (at step S7). Thereafter, the process is completed. With this controlling process, the brake controlling portion 56 and the motor driving portion 57 send control signals to the brake 33 and the motor 31 so as to accomplish a designated motion of the ODV 20.

Figure 9:
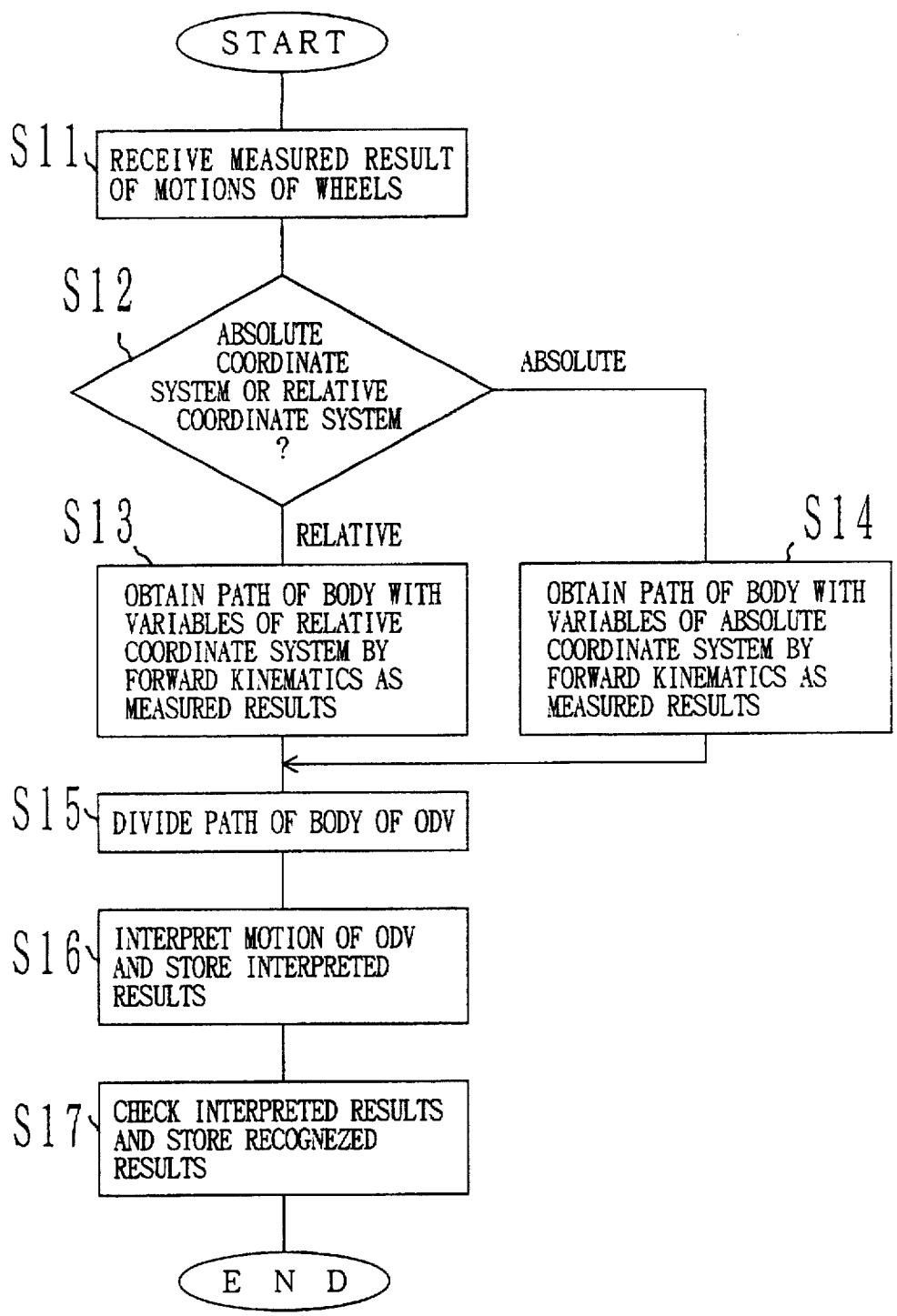
FIG. 9 is a flow chart showing a recognizing process of the motion of the omni-directional vehicle.

FIG. 9 is a flow chart showing a recognizing process performed by the CPU 52. The recognizing process shown in FIG. 9 is performed after the controlling process shown in FIG. 8. When the recognizing process shown in FIG. 9 is started, the CPU 52 receives measured results from the motions of the wheels from the steering angle detecting encoder 34 and the traveling distance detecting encoder 32 (at step S11). The CPU 52 determines whether the target path of the ODV 20 in the controlling process has been designated in the absolute coordinate system or the relative coordinate system (at step S12). When the target path has been designated with variables of the relative coordinate system, the CPU 52 obtains the path of the body with the variables by the forward kinematics of the relative coordinate system (at step S13) as the measured results. When the target path has been designated with variables of the absolute coordinate system, the CPU 52 obtains the path of the body with the variables by the forward kinematics of the absolute coordinate system as the measured results (at step S14).

Next, the CPU 52 divides the target path of the body and obtains a sequence of coordinates of points that the ODV 20 passes and the shape of the path that connects the points (at step S15). The CPU 52 interprets the motion of the ODV 20 and estimates the motion mode between each point that the ODV passes (at step S16). The CPU 52 stores the interpreted results in the memory 53. When the CPU 52 performs the next controlling process, it references the interpreted results stored in the memory 53 at step S2 shown in FIG. 8. The CPU 52 checks the interrupted results, determines the coarse motion that the ODV 20 has performed, and stores the determined results as recognized results in the memory 53 (at step S17). Thereafter, the process is completed.

When the recognized results of the motion of the ODV 20 are significantly different from the motion designated at step S1, the CPU 52 causes a lamp (not shown) to light or a speaker (not shown) to sound so as to issue an alarm to the user. Thereafter, the CPU 52 stops the motion of the ODV 20. When the CPU 52 interprets a command in the next controlling process, it properly compensates the motion of the ODV 20.

Next, with a model of the ODV 20 as a NW-ODV, steps S5 and S6 in FIG. 8 and steps S13 and S14 shown in FIG. 9 will be described in detail.

FIG. 10 is a top view showing a model of the ODV 20 disposed on a two-dimensional plane. Four offset links that have the same length are connected to four corners of a rectangular (or square) body through respective joints that can be independently steered. The offset links are also connected to the respective centers of four wheels that have the same structure and that can be independently driven. The length from the center of the body to each corner is 1. The length from each corner to the center of each wheel is a. The angle between each diagonal line of the rectangle of the body and the horizontal axis of the body is α. The coordinates at the center of the body are (x, y). The angle between the horizontal axis of the body and the axis x is θ. At this point, the position and direction (orientation) of the body are uniquely represented by (x, y, θ).

The front right side wheel of the four wheels is referred to as the first wheel. The remaining wheels are referred to as the second wheel, the third wheel, and the fourth wheel in the counterclockwise order. The i-th wheel has the i-th offset link and the i-th joint (where i=1, 2, 3 4). The angle of the i-th joint is $q_i$. A local rectilinear coordinate system $(\lambda_i, \mu_i)$, and a rotating coordinate system $\psi_i$ are designated to the i-th wheel as shown in FIG. 10. The point $o_c$ and variables v, p, and φ will be described later. In the following mathematical expressions, the differentiation of any variable X of the first order with respect to time is denoted by X dot. The differentiation of any variable X of the second order with respect to time is denoted by X double dot.

In the ODV 20, the drive speed $\lambda_i$ dot (where i=1, 2, 3, 4) and the steering angle $q_i$ (where i=1, 2, 3, and 4) of each wheel can be independently designated within the drive speed limit or steering angle range. By properly designating and controlling the drive speed $\lambda_i$ and the steering angle $q_i$, a motion with three degrees of freedom (two degrees of freedom with respect to position and one degree of freedom with respect to direction) can be accomplished on a plane. In addition, with the offset links, when the body stops, each wheel can be steered without a need to perform the forced direction change operation. The ODV 20 is categorized as a nonholonomic system in (classical) dynamics.

According to the general theory of unified kinematics of the wheeled vehicle, the fundamental equations of the kinematics of an ideal model of the NW-ODW are given by the following formula.

$$\begin{bmatrix} \dot{\lambda}_i \\ \dot{\mu}_i \\ \dot{\psi}_i \end{bmatrix} = \begin{bmatrix} \cos(\theta + q_i) & \sin(\theta + q_i) & l\sin(q_i - \alpha_i) + a \\ -\sin(\theta + q_i) & \cos(\theta + q_i) & l\cos(q_i - \alpha_i) \\ 0 & 0 & 1 \end{bmatrix} \begin{bmatrix} \dot{x} \\ \dot{y} \\ \dot{\theta} \end{bmatrix} + \begin{bmatrix} a \\ 0 \\ 1 \end{bmatrix} \dot{q}_i \quad (1)$$

$(i = 1, 2, \ldots, 4)$ where $\alpha_i$ (i=1, 2, 3, 4) is a constant defined by the following formula.

$$\alpha_i \equiv \begin{cases} \alpha & (i = 1) \\ \pi - \alpha & (i = 2) \\ -\pi + \alpha & (i = 3) \\ -\alpha & (i = 4) \end{cases} \quad (2)$$

In the equation (1), the conversion from the drive speeds and steering angles (steering angular speeds) of all the wheels [$\lambda_1$ dot, $\lambda_2$ dot, ..., $\lambda_4$ dot, $\mu_1$ dot, $\mu_2$ dot, ..., $\mu_4$ dot, $\psi_1$ dot, $\psi_2$ dot, ..., $\psi_4$ dot, $q_1$ dot, $q_2$ dot, ..., $q_4$ dot] to the position (speed) and the direction (angular speed) of the body [x dot, y dot, θ dot] is referred to as forward kinematics. The inverse conversion is referred to as inverse kinematics. In the case of a robot arm, the forward kinematics for obtaining the position and the orientation of the tip with the displacement and the angle of a joint can be more easily obtained than the inverse kinematics. However, in the case of the NW-ODV, as expressed in the formula (1), the inverse kinematics for obtaining the drive speeds and the steering angles of the wheels with the position and the orientation of the body can be more easily obtained than the forward kinematics. For this reason, first, the inverse kinematics will be described. Then, the direct kinematics will be described.

With equations of inverse kinematics of a model of the ODV 20, the motions of the wheels necessary for accomplishing the given motion (target path) of a body can be obtained. In this process, the motion of the ODV is designated and represented in both the absolute coordinate system and the relative coordinate system. The relation between the motion modes of the NW-ODV (namely, the translational mode (including going straight, slantwise, and sidewise), the turning mode, and rotational mode) and the path of the body will be described.

The ODV 20 is driven by controlling the drive speed $\lambda_i$ dot (where i=1, 2, 3, 4) and the steering angle $q_i$ (where i=1, 2, 3, 4) of each wheel. The drive speed $\lambda_i$ dot and the steering angle $q_i$ are produced by the motor 31 that drives the i-th wheel. Next, the inverse kinematics for the conversion from the motion [x dot, y dot, θ] of the body represented in the absolute coordinate system to the drive speeds and the steering angles [$\lambda_1$ dot, $\lambda_2$ dot, ..., $\lambda_4$ dot, $q_1, q_2, \ldots, q_4$] of the wheels will be described. The equations of the inverse kinematics are obtained by adding the following equation (a condition of which is that each wheel does not slide in the horizontal direction) to the fundamental equation of kinematics (formula (1)) and by simultaneously solving these equations.

$$\mu_i = 0 (i=1,2,\ldots,4) \quad (3)$$

At this point, since the number of equations (=3×4+1×4=16) accords with the number of the variables [$\lambda_1$ dot, $\lambda_2$ dot, ..., $\lambda_4$ dot, $\mu_1$ dot, $\mu_2$ dot, ..., $\mu_4$ dot, $\psi_1$ dot, $\psi_2$ dot, ..., $\psi_4$ dot, $q_1, q_2, \ldots, q_4$ (=4×3+4×1=16), when the coefficient matrix of the simultaneous equations is regular, each variable is uniquely obtained. At this point, by designating [x dot, y dot, θ], the motion of the ODV 20 can be fully obtained.

Finally, the inverse kinematics can be calculated as follows.

$$\begin{cases} q_i = \arctan\left(-\frac{S_i}{C_i}\right)\left(\sin q_i = \mp \frac{S_i}{(S_i^2 + C_i^2)^{1/2}}, \cos q_i = \pm \frac{C_i}{(S_i^2 + C_i^2)^{1/2}}\right) \\ \dot{q}_i = \frac{\dot{S}_i C_i - S_i \dot{C}_i}{S_i^2 + C_i^2} \\ \dot{\lambda}_i = \pm (S_i^2 + C_i^2)^{1/2} + \alpha(\dot{\theta} + \dot{q}_i) \end{cases} \quad (4)$$

$(i = 1, 2, \ldots, 4)$ where Si and Ci (i=1, 2, ..., 4) are defined by the following equations.

$$\begin{cases} S_i \equiv \dot{x}\sin\theta - \dot{y}\cos\theta - l\dot{\theta}\cos\alpha_i & (i = 1, 2, \ldots, 4) \\ C_i \equiv \dot{x}\cos\theta + \dot{y}\sin\theta - l\dot{\theta}\sin\alpha_i \end{cases} \quad (5)$$

The differentiation of these equations with respect to time are calculated as follows.

$$\begin{cases} \dot{S}_i = (\ddot{x} + \dot{y}\dot{\theta})\sin\theta - (\ddot{y} - \dot{x}\dot{\theta})\cos\theta - l\ddot{\theta}\cos\alpha_i & (i = 1, 2, \ldots, 4) \\ \dot{C}_i = (\ddot{x} + \dot{y}\dot{\theta})\cos\theta + (\ddot{y} - \dot{x}\dot{\theta})\sin\theta - l\ddot{\theta}\sin\alpha_i \end{cases} \quad (6)$$

By substituting the formulas (5) and (6) into the formulas (4), the following equations are obtained.

$$\begin{cases} q_i = \arctan\left(-\frac{\dot{x}\sin\theta - \dot{y}\cos\theta - l\dot{\theta}\cos\alpha_i}{\dot{x}\cos\theta + \dot{y}\sin\theta - l\dot{\theta}\sin\alpha_i}\right) \\ \dot{q}_i = \frac{\ddot{x}\dot{y} - \dot{x}\ddot{y} - (\dot{x}^2 + \dot{y}^2)\dot{\theta} - l(\ddot{y}\dot{\theta} - \dot{y}\ddot{\theta} - \dot{x}\dot{\theta}^2)\sin(\theta + \alpha_i) - l(\ddot{x}\dot{\theta} - \dot{x}\ddot{\theta} + \dot{y}\dot{\theta}^2)\cos(\theta + \alpha_i)}{\dot{x}^2 + \dot{y}^2 + l^2\dot{\theta}^2 - 2l\dot{\theta}\{\dot{x}\sin(\theta + \alpha_i) - \dot{y}\cos(\theta + \alpha_i)\}} \\ \dot{\lambda}_i = \pm[\dot{x}^2 + \dot{y}^2 + l^2\dot{\theta}^2 - 2l\dot{\theta}\{\dot{x}\sin(\theta + \alpha_i) - \dot{y}\cos(\theta + \alpha_i)\}]^{1/2} + a(\dot{\theta} + \dot{q}_i) \end{cases} \quad (7)$$

$(i = 1, 2, \ldots, 4)$

The signs in the equations (4) and (7) are double signs in same order. The double signs take place because the steering angle qi of each wheel has two solutions that deviate for $\pi$.

Now, consider the case that the ODV 20 detects an obstacle with information received from the sensor 27, and travels so that it does not collide with the obstacle. In this case, it is convenient to designate the motion of the vehicle in the relative coordinate system rather than the absolute coordinate system. From this point of view, the relative coordinate system for representing the motion of the ODV 20 is newly introduced. In addition, the inverse kinematics for the conversion from the motion [v, ρ, φ] of the body represented in the relative coordinate system to the drive speeds and the steering angles [$\lambda_1$ dot, $\lambda_2$ dot, ..., $\lambda_4$ dot, $q_1$, $q_2$, ..., $q_4$] of each wheel will be described.

FIG. 10 shows variables v, ρ, and φ and point $o_c$. The point $o_c$ is the center point of the turning of the body. The variables v and ρ are tangential velocity and the radious of curvature as defined in curve theory, respectively. In this case, the variables v and ρ represent the traveling speed and the turning radius of the body, respectively. The variable φ is the angle between the horizontal axis and the traveling direction of the body. At this point, the conversion from [x dot, y dot, θ] to [v, ρ, φ] is given by the following equations.

$$\begin{cases} v = (\dot{x}^2 + \dot{y}^2)^{1/2} \\ \rho = \frac{(\dot{x}^2 + \dot{y}^2)^{3/2}}{\ddot{x}\dot{y} - \dot{x}\ddot{y}} \\ \phi = \arctan\left(\frac{\dot{y}}{\dot{x}}\right) - \theta \end{cases} \quad (8)$$

The inverse conversion is given by the following equations.

$$\begin{cases} \dot{x} = v\cos(\theta + \phi) \\ \dot{y} = v\sin(\theta + \phi) \\ \dot{\theta} + \dot{\phi} = \frac{v}{\rho} \end{cases} \quad (9)$$

Because of the formula (8), the variable v always satisfies v≧0. When |ρ|=0, the body rotates. When 0<|ρ|<∞, the body turns (when ρ<0, the body turns counterclockwise; when ρ<0, the body rotates clockwise). When |ρ|=∞, the body goes straight, slantwise, or sidewise. |ρ| represents the magnitude of ρ. When 0<φ<π, the body travels forward. When 0>φ>−π, the body travels backward. Thus, the conditions of |ρ|=0, 0<|ρ|<∞, and |ρ|<=∞ accord with the rotational mode, the turning mode, and the translational mode (including going straight, slantwise, and sidewise), respectively. Corresponding to the value of ρ, the motion mode of the NW-ODV can be designated.

The equations of inverse kinematics for the conversion from [v, ρ, φ] to [$\lambda_1$ dot, $\lambda_2$ dot, ..., $\lambda_4$ dot, $q_1$, $q_2$, ..., $q_4$] are obtained by substituting the formula (9) into the formulas (4), (5), and (6).

$$\begin{cases} q_i = \arctan\left(-\frac{S_i}{C_i}\right)\left(\sin q_i = \mp \frac{S_i}{(S_i^2 + C_i^2)^{1/2}}, \right. \\ \left. \cos q_i = \pm \frac{C_i}{(S_i^2 + C_i^2)^{1/2}}\right) \\ \dot{q}_i = \frac{\dot{S}_i C_i - S_i \dot{C}_i}{S_i^2 + C_i^2} \\ \dot{\lambda}_i = \pm(S_i^2 + C_i^2)^{1/2} + \alpha\left\{\left(\frac{v}{\rho} - \dot{\phi}\right) + \dot{q}_i\right\} \end{cases} \quad (10)$$

$(i = 1, 2, \ldots, 4)$ where $S_i$ and $C_i$ (i=1, 2, ..., 4) are given by the following formula.

$$\begin{cases} S_i = -v\sin\phi - l\left(\frac{v}{\rho} - \dot{\phi}\right)\cos\alpha_i \\ C_i = v\cos\phi - l\left(\frac{v}{\rho} - \dot{\phi}\right)\sin\alpha_i \end{cases} \quad (11)$$

13

-continued $(i = 1, 2, \ldots, 4)$

The formula (11) can be differentiated as follows.

$$\begin{cases} \dot{S}_i = -\dot{v}\sin\phi - v\dot{\phi}\cos\phi - l\left(\frac{\dot{v}\rho - v\dot{\rho}}{\rho^2} - \ddot{\phi}\right)\cos\alpha_i \\ \dot{C}_i = \dot{v}\cos\phi - v\dot{\phi}\sin\phi - l\left(\frac{\dot{v}\rho - v\dot{\rho}}{\rho^2} - \ddot{\phi}\right)\sin\alpha_i \end{cases} \quad (12)$$

$(i = 1, 2, \ldots, 4)$

By substituting the formulas (11) and (12) into the formula (10), the following formula is obtained.

$$\begin{cases} q_i = \arctan\left(\frac{v\sin\phi + l\left(\frac{v}{\rho} - \dot{\phi}\right)\cos\alpha_i}{v\cos\phi - l\left(\frac{v}{\rho} - \dot{\phi}\right)\sin\alpha_i}\right) \\[2mm] \dot{q}_i = \dfrac{v^2\dot{\phi} + lv\dot{\phi}\left(\frac{v}{\rho} - \dot{\phi}\right)\sin(\phi - \alpha_i) - l\left(\dot{v}\dot{\phi} - v\ddot{\phi} + \frac{v^2\dot{\rho}}{\rho^2}\right)\cos(\phi - \alpha_i)}{v^2 + l^2\left(\frac{v}{\rho} - \dot{\phi}\right)^2 + 2lv\left(\frac{v}{\rho} - \dot{\phi}\right)\sin(\phi - \alpha_i)} \\[2mm] \dot{\lambda}_i = \pm\left\{v^2 + l^2\left(\frac{v}{\rho} - \dot{\phi}\right)^2 + 2lv\left(\frac{v}{\rho} - \dot{\phi}\right)\sin(\phi - \alpha_i)\right\}^{1/2} + a\left\{\left(\frac{v}{\rho} - \dot{\phi}\right) + \dot{q}_i\right\} \end{cases} \quad (13)$$

$(i = 1, 2, \ldots, 4)$

Next, specifically the case of which the following conditions are satisfied in the formula (13) will be described.

$$\begin{cases} \dot{\rho} = 0 \\ \dot{\phi} = 0 \end{cases} \quad (14)$$

The equations (14) represent that $\rho$ and $\phi$ are constants. At this point, the formula (13) is given as follows.

$$\begin{cases} q_i = \arctan\left(\frac{\rho\sin\phi + l\cos\alpha_i}{\rho\cos\phi - l\sin\alpha_i}\right) \\ \dot{q}_i = 0 \quad (i = 1, 2, \ldots, 4) \\ \dot{\lambda}_i = \dfrac{\pm\{l^2 + \rho^2 + 2l\rho\sin(\phi - \alpha_i)\}^{1/2} + a}{\rho} v \end{cases} \quad (15)$$

When $\rho \to 0$, the relation of $v \to \rho \cdot \dot{\theta}$ is satisfied. Thus, the formula (15) is given as follows.

$$\begin{cases} q_i \to \alpha_i + \frac{1}{2}\pi, \alpha_i + \frac{3}{2}\pi & (i = 1, 2, \ldots, 4) \\ \dot{\lambda}_i \to (l + a)\dot{\theta}, (l - a) \cdot (i - \dot{\theta}) \end{cases} \quad (16)$$

On the other hand, when $\rho \to \infty$, the formula (16) is given by the following formula.

$$\begin{cases} q_i \to \phi, \phi + \pi & (i = 1, 2, \ldots, 4) \\ \dot{\lambda}_i \to v, -v \end{cases} \quad (17)$$

The formulas (15), (16), and (17) accord with the conditions of $0<|\rho|<\infty$, $|\rho|=0$, and $|\rho|=\infty$, respectively. In other words, when the formula (14) is satisfied, it is clear that the equations of inverse kinematics of the motion modes of the turning mode, the rotational mode, and the translational mode are briefly represented by the formulas (15), (16), and (17), respectively.

14

Figure 11:
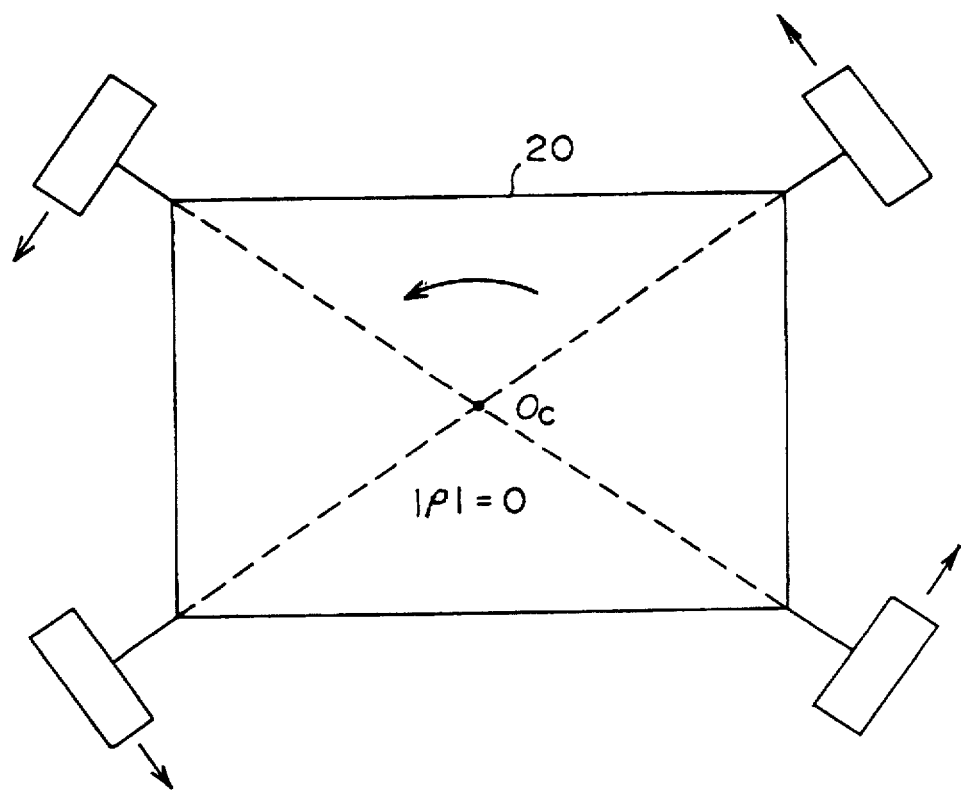
FIG. 11 is a schematic diagram showing a rotational mode of the omni-directional vehicle.
Figure 12:
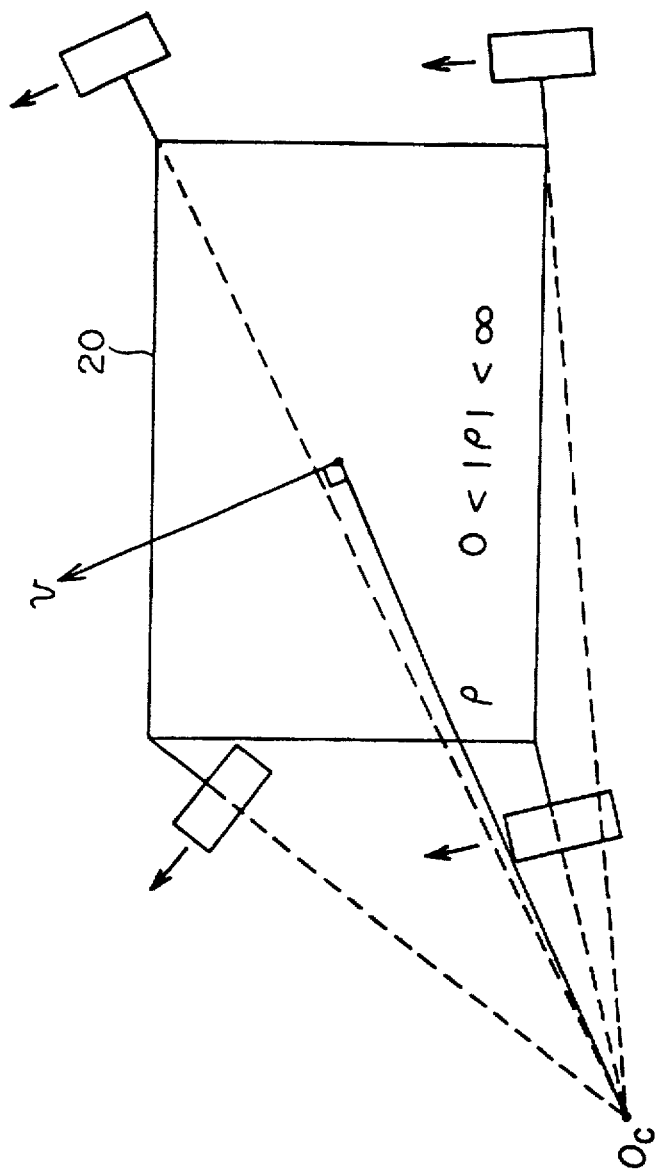
FIG. 12 is a schematic diagram showing a turning mode of the omni-directional vehicle.
Figure 13:
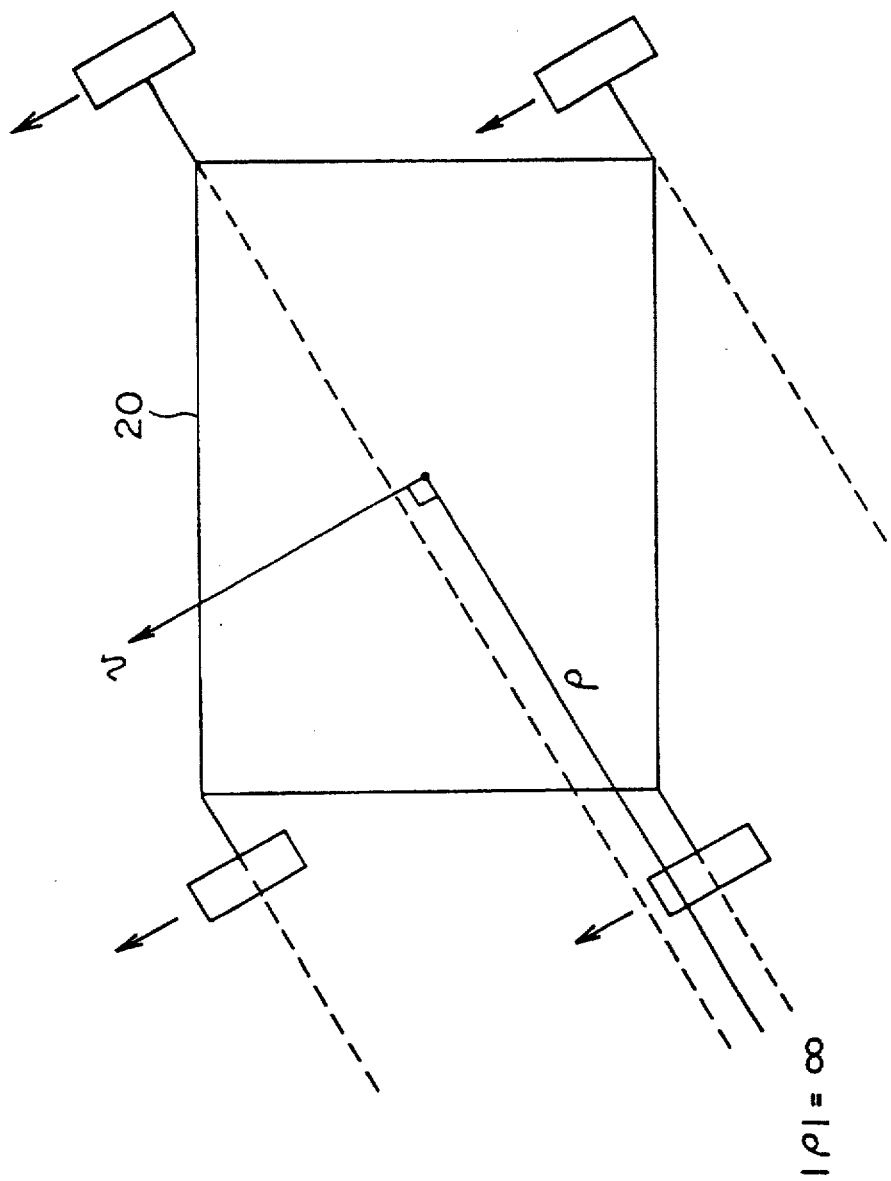
FIG. 13 is a schematic diagram showing a translational mode of the omni-directional vehicle.

FIGS. 11, 12, and 13 show the rotational mode, the turning mode, and the translational mode of the ODV 20. In FIG. 11, the point $o_c$ coincides with the center point of the body. As is clear from the formula (16), the offset links of the wheels orientate the center point of the body. The ODV 20 rotates about the point $o_c$. In FIG. 12, the point $o_c$ exists outside the body. The offset links of the wheels orientate the point $o_c$. The ODV 20 turns about the point $o_c$ at speed v. In FIG. 13, the point $o_c$ exists at a position infinitely distant from the body. The offset links of the wheels orientate the point $o_c$. Since the point $o_c$ is infinitely distant from the body, as is clear from the formula (17), all the offset links are in parallel with each other. The ODV 20 goes straight, slantwise, or sidewise in the direction perpendicular to the axis $\rho$ at speed v.

With the formula (8), the case of which [x dot, y dot, θ] is designated at step S3 of FIG. 8 and the case of which [v, ρ, φ] is designated can be unified as shown in FIG. 14.

In FIG. 14, when the time course of [x dot, y dot, θ] is designated as a function of time t, [x double dot, y double dot, θ dot] are calculated and [v, ρ, φ] are obtained corresponding to the formula (8). [v dot, ρdot, φ dot] and φ double dot are then calculated and, corresponding to the formulas (11), (12), (10), or (13), the time dependency of [$q_i$, $q_i$ dot, $\lambda_i$ dot] is obtained. When the time dependency of [v, ρ, φ] is designated as a function of time t, [v dot, ρdot, φ dot] and φ double dot are calculated without need to use the formula (8). With the formulas (11), (12), (10), or (13), the time course of [$q_i$, $q_i$ dot, $h_i$ dot] is obtained.

Next, the forward kinematics of the ODV 20 will be described. When the equations of the forward kinematics are used, the trajectory of the body (the motion of the body) can be calculated with the drive speeds and the steering angles of the wheels measured by the traveling distance detecting encoder 32 and the steering angle detecting encoder 34. The motion of the body can be represented by [x dot, y dot, θ dot] in the absolute coordinate system. On the other hand, the motion of the body can be represented by [v, ρ, φ] in the relative coordinate system. The limit values of the traveling speed and the turning radius of the body corresponding to the limit values of the drive speeds and the steering angles of the wheels can be obtained. However, it is generally difficult to obtain the equations of the forward kinematics of the NW-ODV. Thus, in this example, a case of which particular conditions are satisfied will be described.

First, equations of the forward kinematics for the conversion from [$\lambda_i$ dot, $\mu_i$ dot, $\psi_i$ dot, $q_i$ dot] (i ∈ {1, 2, . . . , 4}) to [dot, y dot, θ dot] will be described. By solving the formulas (1), which are fundamental equations of kinematics, with respect to [x dot, y dot, θ dot], the equations of the forward kinematics can be obtained.

$$\begin{bmatrix} \dot{x} \\ \dot{y} \\ \dot{\theta} \end{bmatrix} = \begin{bmatrix} \cos(\theta + q_i) & -\sin(\theta + q_i) & -a\cos(\theta + q_i) + l\sin(\theta + \alpha_i) \\ \sin(\theta + q_i) & \cos(\theta + q_i) & a\sin(\theta + q_i) + l\cos(\theta + \alpha_i) \\ 0 & 0 & 1 \end{bmatrix} \left( \begin{bmatrix} \dot{\lambda}_i \\ \dot{\mu}_i \\ \dot{\psi}_i \end{bmatrix} - \begin{bmatrix} a \\ 0 \\ 1 \end{bmatrix} \dot{q}_i \right) \quad (18)$$

$(i \in \{1, 2, \ldots, 4\})$

However, the equation (18) has two problems. The first problem is in that the right side has $\dot{\psi}$ dot. Normally, the value of $\dot{\psi}$ dot is difficult to control. Practically, it is preferred that [dot, y dot, θ dot] does not include $\dot{\psi}$ dot. The second problem is in that the matrix on the right side still includes θ. Thus, generally, it is possible to numerically solve the equations (18). However, it is difficult to analytically solve the equations (18).

On the other hand, when the traveling speed and the rotating radius of the body are calculated with the drive speeds and the steering angles of the wheels measured, it is meaningful to solve the equation (18). In this case, three equations are selected from eight equations with respect to $\lambda_i$ dot and $\mu_i$ dot (i=1, 2, ..., 4) in the equations (1), so that the coefficient matrix becomes regular. By simultaneously solving the selected three equations with respect to [x dot, y dot, θ dot], the traveling speed and rotating radius of the body can be obtained.

On the other hand, to obtain the limit values of the traveling speed and the rotating radius of the body corresponding to the limit values of the drive speeds and the steering angle of the wheels, analytical solutions are required. Thus, in this case, equations of forward kinematics for the conversion from $[\lambda_i$ dot, $q_j$, $q_k]$ (i, j, k ∈ {1, 2, ..., 4, j ≠k} to [v, ρ, φ] are obtained. However, as described above, general solutions are very difficult to obtain. Thus, a case in which the condition (14) is satisfied will be described.

The equations of the forward kinematics can be obtained by solving the following first and third equation groups of the formula (15) with respect to [v, ρ, φ].

$$\begin{cases} q_i = \arctan\left( \dfrac{\rho\sin\phi + l\cos\alpha_i}{\rho\cos\phi - l\sin\alpha_i} \right) \\ \dot{\lambda}_i = \dfrac{\pm \{l^2 + \rho^2 + 2l\rho\sin(\phi - \alpha_i)\}^{\frac{1}{2}} + a}{\rho} v \end{cases} \quad (19)$$

$(i = 1, 2, \ldots, 4)$

The formula (19) has eight equations (2×4=8), whereas the number of variables [v, ρ, φ] to be obtained is three. Thus, the formula (19) is redundant. In other words, by designating only particular $[\lambda_i$ dot, $q_j$, $q_k]$ (i, j, k ∈ {1, 2, ..., 4}, j≠k}, [v, ρ, φ] can be obtained. Thus, the motion of the ODV 20 can be completely determined without need to designate all $[\lambda_i$ dot, $q_j$, $q_k]$ with respect to i, j, and k. By substituting the values of the obtained [v, α, φ] into one of the formulas (15), (16), and (17) corresponding to the selected motion mode, the value of the remaining variables can be obtained. Finally, the direct kinematics can be expressed by the following formula.

$$\begin{cases} \phi = \arctan\left( \dfrac{\sin q_j \cos(q_k - \alpha_k) - \sin q_k \cos(q_j - \alpha_j)}{\cos q_j \cos(q_k - \alpha_k) - \cos q_k \cos(q_j - \alpha_j)} \right) \\ \rho = \dfrac{\cos(q_j - \alpha_j)}{\sin(q_j - \phi)} l \\ v = \dfrac{\rho}{\pm \{l^2 + \rho^2 + 2l\rho\sin(\phi - \alpha_i)\}^{\frac{1}{2}} + a} \dot{\lambda}_i \end{cases} \quad (20)$$

$(i, j, k \in \{1, 2, \ldots, 4\}, j \neq k)$

The limit values of the traveling speed v and the turning radius ρ of the body corresponding to the limit values of the drive speeds $\lambda_i$ dot and steering angles $q_i$ of the wheels can be obtained corresponding to the formula (20). The formula (14) represents that ρ and φ are constants. When a time period is divided into small regions and the formula (14) is approximately satisfied in each small region, the formula (20) can be applied in the case that ρ and φ vary. In other words, the formula (20) provides one method for approximately obtaining the motion of the body with the measured results of the motions of the wheels.

Next, forward kinematics for the conversion from $[k_i$ dot, $q_j$, $q_k]$ to [x dot, y dot, θ] will be described. [x dot, y dot, θ] is calculated by substituting [v, ρ, φ] obtained by the formula (20) into the formula (9). However, the result is valid when the formula (14) is satisfied.

Next, with reference to FIGS. 15 and 16, the method for controlling the motion mode of the ODV 20 and a practical example thereof will be described.

Figure 15:
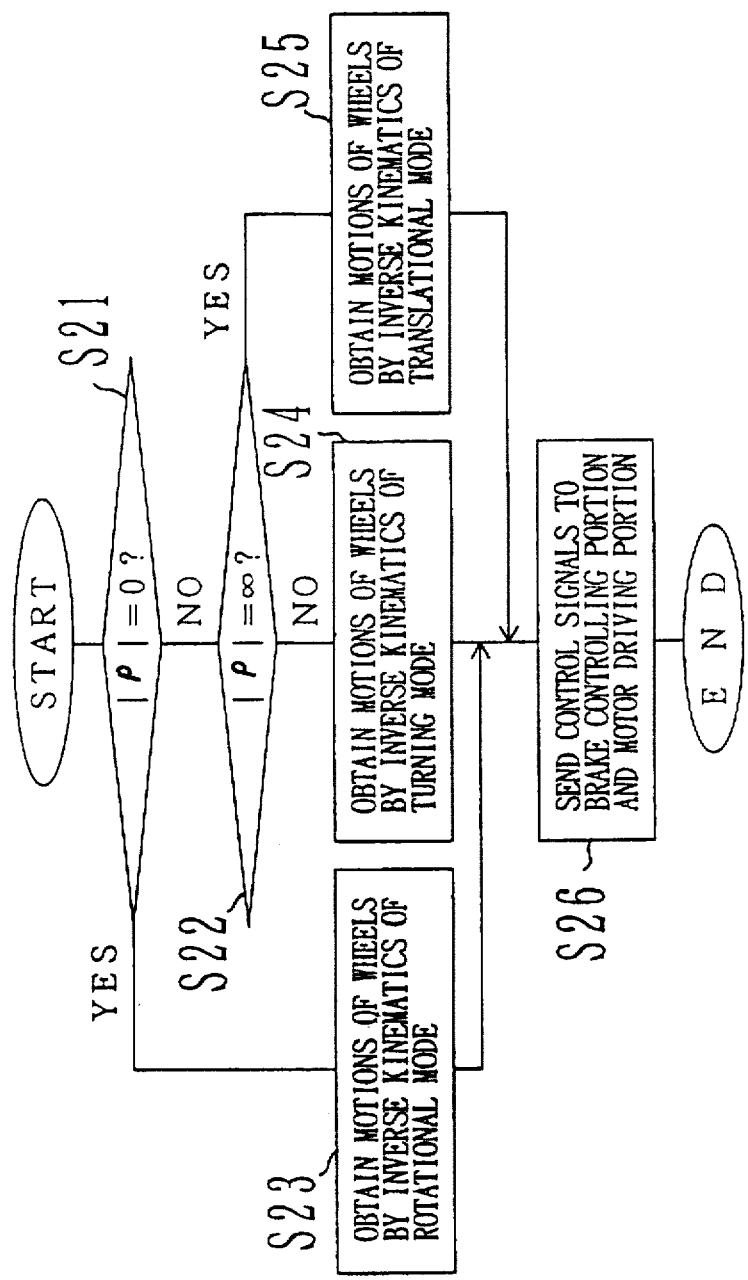
FIG. 15 is a flow chart showing a mode controlling process of the omni-directional vehicle.

FIG. 15 is a flow chart showing a mode controlling process performed by the CPU 52. The mode controlling process shown in FIG. 15 is performed when the motion of the body is designated with variables of the relative coordinate system and the condition (14) is designated. This process accords with steps S5 and S7 of FIG. 8. When the process is started in FIG. 15, the CPU 52 determines whether or not |ρ|=0 has been designated (at step S21). When |ρ|=0, the motions of the wheels are obtained by the inverse kinematics of the rotational mode given by the formula (16) (at step S23). The CPU 52 sends corresponding control signals to the brake controlling portion 56 and the motor driving portion 57 at step S26). Thereafter, the process is completed.

When |ρ|≠0, the CPU 52 determines whether or not |ρ|=∞ has been designated (at step S22). When |ρ|=∞, the CPU 52 obtains the motions of the wheels by the inverse kinematics of the translational mode expressed by the formula (17) (at step S25). The CPU 52 sends corresponding control signals to the brake controlling portion 56 and the motor driving portion 57 (at step S26). Thereafter, the process is completed. When |ρ|≠0 and |ρ|≠∞, namely, when 0 <|ρ|<∞, the CPU 52 obtains the motions of the wheels by the inverse kinematics of the rotating mode expressed by the formula (15) (at step S24). The CPU 52 sends corresponding control signals to the brake controlling portion 56 and the motor driving portion 57 (at step S26). Thereafter, the process is completed.

Figure 16:
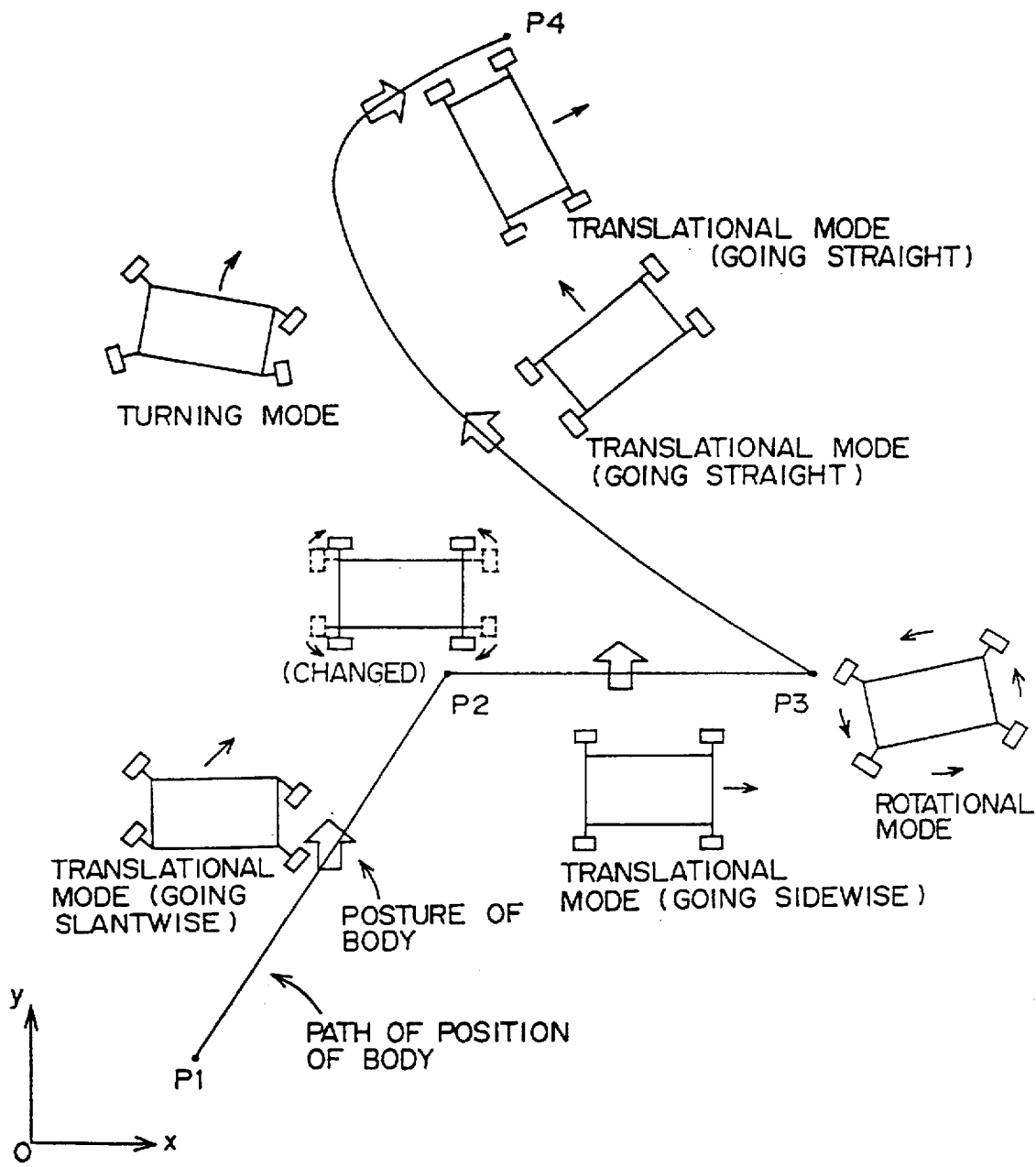
FIG. 16 is a schematic diagram showing an actual example of motion mode change operations of the omni-directional vehicle.

FIG. 16 is a schematic diagram showing a changing operation of motion modes. In FIG. 16, four points P1, P2, P3, and P4 represent sequences of points that the ODV 20 passes. The sequences of points are generated at step S2 of FIG. 8. Now assume the motion of the ODV 20 is designated so that the ODV 20 starts from point P1, passes through points P2 and P3, and reaches point P4. In region P1–P2, |p|=∞ is again designated, and the ODV 20 is controlled in the translational mode (going slantwise) from the point P1 to the point P2. In region P2–P3, |p|≠∞ is designated. The steering angles of the wheels are changed at the point P2. Thus, the directions of the wheels are changed. The ODV 20 is controlled in the translational mode (going sidewise) until it reaches the point P3.

Thereafter, at the point P3, since |p|=0, the ODV is controlled in the rotational mode and the orientation of the body is changed. In region P3–P4, |p|=∞, 0<|p|<∞, and |p|=∞ are successively designated and the ODV 20 is controlled in the order of the translational mode (going straight), the turning mode, and the translational mode (going straight). In the rotating mode, the position of the body and the orientation thereof are changed. Thus, the ODV 20 travels toward the point P4. Thus, when the target path is represented with variables of the relative coordinate system and the turning radius p is designated, the motion of the ODV 20 can be controlled by changing the motion mode among three modes.

In the embodiment, the relation between the conception of the motion modes (such as the translational mode, the turning mode, and the rotational mode) intrinsic to the NW-ODV and the motion of the body, becomes clear. Generally, the motion plan of an nonholonomic system is very difficult to perform. Although the NW-ODV is a nonholonomic system, when the conception of the motion modes is introduced, the motion plan can be substituted with a problem of selecting motion modes and a problem of changing one motion mode to another motion mode. Thus, even if the NW-ODV is a nonholonomic system, the motion plan thereof is much easier than that of the conventional three-wheeled or four-wheeled vehicles which are also nonholonomic systems. In other words, the NW-ODV can be more easily controlled than the conventional wheeled vehicles. In addition, the motion performance accuracy of the NW-ODV is higher than that of the conventional wheeled vehicles.

According to the present invention, in the relative coordinate system corresponding to the ODV, the motion thereof can be designated. Thus, when the ODV avoids an obstacle with a signal received from a sensor thereof, the motion of the ODV can be effectively controlled. In addition, the coordinate system for representing the motion of the body of the ODV can be changed between the absolute coordinate system and the relative coordinate system. In particular, the relative coordinate system directly relates to the motion mode of the ODV. Thus, the motion modes can be freely designated.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

The control device 26 can be driven as a computer or using a computer. In this case, the above described processes for controlling the robot may be realized by computer programs, which may be stored in RAM, ROM, hard-disc, or the like, and may also be stored in external storage mediums of magnetic disc, optical discs, optmagnetic discs, etc.

What is claimed is:

1. A controlling apparatus for controlling a motion of a normal wheeled omni-directional vehicle, comprising:
   storing means for storing a first control command for designating a motion of a body of the normal wheeled omni-directional vehicle with data of relative variables of a relative coordinate system defined for the body of the normal wheeled omni-directional vehicle; and
   converting means for converting the first control command into motions of wheels of the normal wheeled omni-directional vehicle by calculations of inverse kinematics in the relative coordinate system using the data of the relative variables, obtaining data of drive variables representing the motions of the wheels, and outputting control signals corresponding to the obtained data of the drive variables.

2. The controlling apparatus as set forth in claim 1,
   wherein said storing means store at least one of the traveling speed of the body, the turning radius of the body, and an angle representing a traveling direction of the body as the relative variables; and
   wherein said converting means determine at least one of the drive speeds of the wheels and the steering angles of the wheels as the drive variables with the relative variables.

3. The controlling apparatus as set-forth in claim 2,
   wherein said converting means calculate time course of the drive speeds of the wheels and the steering angles of the wheels with the time course of the traveling speed of the body, the turning angle of the body, and the angle representing the traveling direction of the body designated by the first control command.

4. The controlling apparatus as set forth in claim 1, further comprising:
   driving means for receiving the control signals and for one of driving and steering the wheels so as to accomplish the first control command.

5. The controlling apparatus as set forth in claim 1, further comprising:
   measuring means for measuring motions of the wheels and for sending the measuring results to said converting means,
   wherein said converting means convert the measuring results into a motion of the body represented with the relative variables,
   wherein said storing means store a motion of the body as the measuring results, and
   wherein said converting means convert a second control command corresponding to a difference between contents of the first control command and a motion of the body obtained from the measuring results.

6. The controlling apparatus as set forth in claim 1,
   wherein said storing means store a third control command for designating a motion of the body with absolute variables of an absolute coordinate system defined in the environment of the normal wheeled omni-directional vehicle, and
   wherein said converting means determine the drive variables corresponding to one of the first control command and the third control command by calculations of inverse kinematics of which the relative coordinate system and the absolute coordinate system are unified.

7. The controlling apparatus as set forth in claim 1, further comprising:
   mode designating means for selecting one of a plurality of motion modes of the normal wheeled omni-directional vehicle and sending the selected motion mode as a first motion mode to said converting means when the turning radius of the body has been stored as the relative variables in said storing means, the motion modes being distinguished corresponding to the value of the turning radius, wherein said converting means determine the drive variables corresponding to the first motion mode.

8. The controlling apparatus as set forth in claim 7, wherein said mode designating means designate a rotational mode as the first motion mode when the value of the turning radius is zero, designate a translational mode as the first motion mode when the value of the turning radius is infinite, and designate a turning mode as the first motion mode when the value of the turning radius is nonzero finite.

9. The controlling apparatus as set forth in claim 8, wherein said converting means determine the drive speeds of the wheels and the steering angles of the wheels as the drive variables so as to rotate the body when the first motion mode is the rotational mode, determine the drive speeds of the wheels and the steering angles of the wheels as the drive variables so as to go straight, slantwise, or sidewise the body when the first motion mode is the translational mode, and for obtaining the drive speeds of the wheels and the steering angles of the wheels so as to turn the body about a particular point with the turning radius when the first motion mode is the turning mode.

10. The controlling apparatus as set forth in claim 8, wherein said storing means store a second control command after the first control command, and wherein said mode designating means select a second motion mode designated by the second control command and change a motion mode performed by said converting means after said mode designating means select the first motion mode.

11. A controlling apparatus for controlling the motion of a normal wheeled omni-directional vehicle that can travel in any direction, comprising:

measuring means for measuring values of drive variables representing the motions of wheels of the normal wheeled omni-directional vehicle and for outputting the measured results; and converting means for converting the measured results into data of relative variables of a relative coordinate system defined for a body of the normal wheeled omni-directional vehicle by calculations of forward kinematics, for recognizing the motion of the body in the relative coordinate system using the data of the relative variables, and for outputting the recognized results.

12. The controlling apparatus as set forth in claim 11, wherein said measuring means measure at least one of the drive speeds of the wheels and steering angles of the wheels as the drive variables, and wherein said converting means determine at least one of a traveling speed of the body, a turning radius of the body, an angle representing a traveling direction of the body as the relative variables.

13. The controlling apparatus as set forth in claim 12, wherein said converting means calculate time course of the traveling speed of the body, the turning radius of the body, and the angle representing the traveling direction of the body with approximated representations of time course of drive speeds of the wheels and steering angles of the wheels.

14. The controlling apparatus as set forth in claim 13, wherein said converting means convert the time course of a traveling speed of the body, a turning radius of the body, and an angle representing the traveling direction of the body into time course of absolute variables of an absolute coordinate system defined for the environment of the normal wheeled omni-directional vehicle and for recognizing a position and a orientation of the body represented by the absolute variables.

15. A method for controlling motion of a normal wheeled omni-directional vehicle, comprising the steps of:

designating motion of a body of the normal wheeled omni-directional vehicle with data of relative variables of a relative coordinate system defined for the body of the normal wheeled omni-directional vehicle;

converting a first control command into motions of wheels of the normal wheeled omni-directional vehicle by calculations of inverse kinematics in the relative coordinate system using the data of the relative variables so as to obtain data of drive variables representing the motions of the wheels; and controlling the motions of the wheels with the obtained data of the drive variables.

16. The method as set forth in claim 15, further comprising the steps of:

measuring values of drive variables representing motions of the wheels of the normal wheeled omni-directional vehicle; and converting the measured values into second relative variables of the relative coordinate system by calculations of forward kinematics so as to recognize motion of the body represented by the second relative variables.

17. The method as set forth in claim 15, further comprising the steps of:

designating motion of the body with variables of an absolute coordinate system defined for the body; and controlling motion of the body corresponding to the designated variables.

18. The method as set forth in claim 15, further comprising the steps of:

measuring values of drive variables representing motions of the wheels of the normal wheeled omni-directional vehicle; and converting the measured values into variables of an absolute coordinate system by calculations of direct kinematics so as to recognize motions of the body represented by the variables.

19. A method for controlling the motion of a normal wheeled omni-directional vehicle that can travel in any direction, comprising the steps of:

measuring values of drive variables representing motions of wheels of the normal wheeled omni-directional vehicle;

converting the measured values into data of relative variables of a relative coordinate system defined for the body of the normal wheeled omni-directional vehicle by calculations of forward kinematics and so as to recognize motion of the body in the relative coordinate system using the data of the relative variables; and designating the motion of the body corresponding to the recognized motion of the body.

20. A normal wheeled omni-directional vehicle having normal wheels for traveling in omni-directions, comprising:

storing means for storing a control command for designating motion of a body of the normal wheeled omni-directional vehicle with data of relative variables of a relative coordinate system defined in the body of the normal wheeled omni-directional vehicle; and converting means for converting the control command into motions of wheels of the normal wheeled omni-directional vehicle by calculations of inverse kinematics in the relative coordinate system using the data of the relative variables, obtaining data of drive variables representing motions of the wheels, and outputting control signals corresponding to the obtained data of the drive variables.

21. A computer readable storage medium used to direct a computer to perform the functions of:

designating motion of a normal wheeled omni-directional vehicle having normal wheels that can travel in any direction with data of relative variables of a relative coordinate system defined for the normal wheeled omni-directional vehicle as a control command so as to control the motion of the normal wheeled omni-directional vehicle;

converting the control command into motions of the wheels of the normal wheeled omni-directional vehicle by calculations of inverse kinematics for the relative coordinate system using the data of the relative variables so as to obtain data of drive variables representing the motions of the wheels; and controlling the motions of the wheels of the normal wheeled omni-directional vehicle with control signals corresponding to the data of the drive variables.

* * * * *